US008294318B2

(12) United States Patent
Bando et al.

(10) Patent No.: US 8,294,318 B2
(45) Date of Patent: Oct. 23, 2012

(54) ELECTRIC MOTOR AND ROTOR FOR ROTATING ELECTRIC MACHINE

(75) Inventors: Masashi Bando, Wako (JP); Noriyuki Abe, Wako (JP); Shigemitsu Akutsu, Wako (JP); Satoyoshi Oya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/745,704

(22) PCT Filed: Dec. 12, 2008

(86) PCT No.: PCT/JP2008/072657
§ 371 (c)(1),
(2), (4) Date: Jun. 2, 2010

(87) PCT Pub. No.: WO2009/081766
PCT Pub. Date: Jul. 2, 2009

(65) Prior Publication Data
US 2010/0289365 A1  Nov. 18, 2010

(30) Foreign Application Priority Data

Dec. 26, 2007 (JP) .................................. 2007-333899
Feb. 4, 2008 (JP) .................................. 2008-023521
Jun. 3, 2008 (JP) .................................. 2008-145566

(51) Int. Cl.
*H02K 21/12* (2006.01)

(52) U.S. Cl. .................................. 310/156.01; 310/112
(58) Field of Classification Search ............ 310/156.01–156.84, 114, 112, 113
See application file for complete search history.

(56) References Cited

U.S. PATENT DOCUMENTS

| 5,528,094 A * | 6/1996 | Hasebe et al. | 310/112 |
| 6,737,778 B2 * | 5/2004 | Daikoku et al. | 310/112 |
| 7,615,903 B2 * | 11/2009 | Holmes et al. | 310/90 |

(Continued)

FOREIGN PATENT DOCUMENTS

EP  1 220 426 A2  7/2002
(Continued)

OTHER PUBLICATIONS

Japanese Office Action application No. 2008-145566 dated Mar. 23, 2011.

(Continued)

*Primary Examiner* — Nguyen N Hanh
(74) *Attorney, Agent, or Firm* — Squire Sanders (US) LLP

(57) ABSTRACT

An electric motor (M) includes first and second stators (12L, 12R) on the outside forming a rotating magnetic field, an outer rotor (13) disposed inside the first and second stators (12L, 12R) and having first and second induced magnetic poles (38L, 38R), and an inner rotor (14) disposed inside the outer rotor (13) and having first and second permanent magnet (52L, 52R). The phases of the first and second induced magnetic poles (38L, 38R) of the outer rotor (13) are displaced from each other by only half of a predetermined pitch, and the phases of the first and second permanent magnets (52L, 52R) of the inner rotor (14) are displaced from each other by only the predetermined pitch. Accordingly, the first and second stators (12L, 12R) facing the first induced magnetic poles (38L) and the second induced magnetic pole (38R) can be made to have the same phase and polarity, thus simplifying the structures of the first and second stators (12L, 12R).

13 Claims, 31 Drawing Sheets

U.S. PATENT DOCUMENTS 7,791,245 B1 * 9/2010 Hao et al. .................. 310/266

FOREIGN PATENT DOCUMENTS

| EP | 1 484 518 A2 | 12/2004 |
|---|---|---|
| JP | 08-168223 A | 6/1996 |
| JP | 09-9602 | 1/1997 |
| JP | 11-341757 | 12/1999 |
| JP | 2006-025559 A | 1/2006 |
| JP | 2006-187194 | 7/2006 |
| JP | 2006-238623 | 9/2006 |
| JP | 2006-353009 | 12/2006 |
| JP | 2007-129869 | 5/2007 |
| JP | 2007-244064 | 9/2007 |
| WO | 2005/050824 A1 | 6/2005 |

OTHER PUBLICATIONS

European Search Report application No. EP 08 86 5085 dated Apr. 15, 2011.

* cited by examiner

ROTATIONAL DIRECTION OF MAGNETIC FIELD

FIG.11
(A)
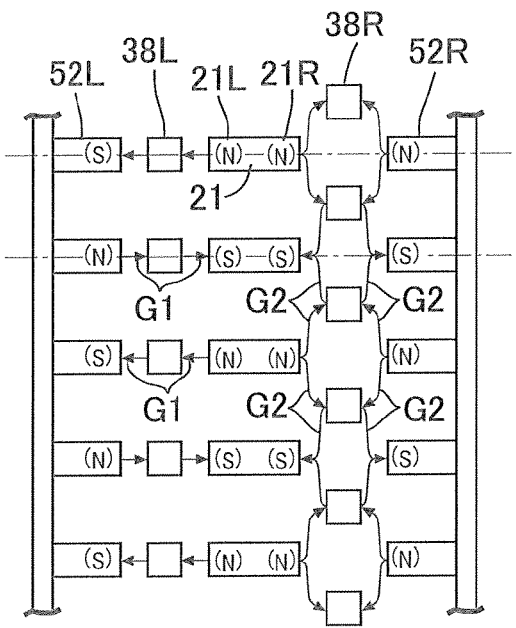
(B)
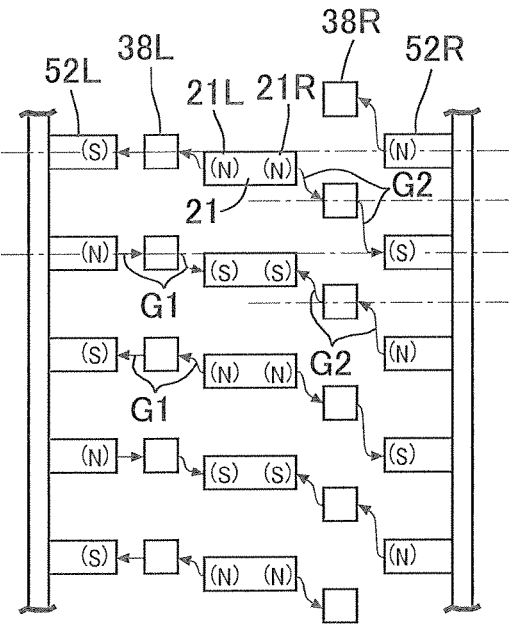
(C)
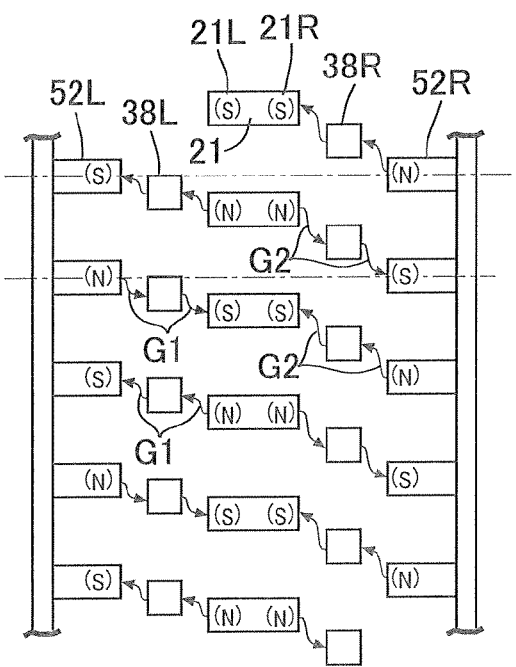
(D)
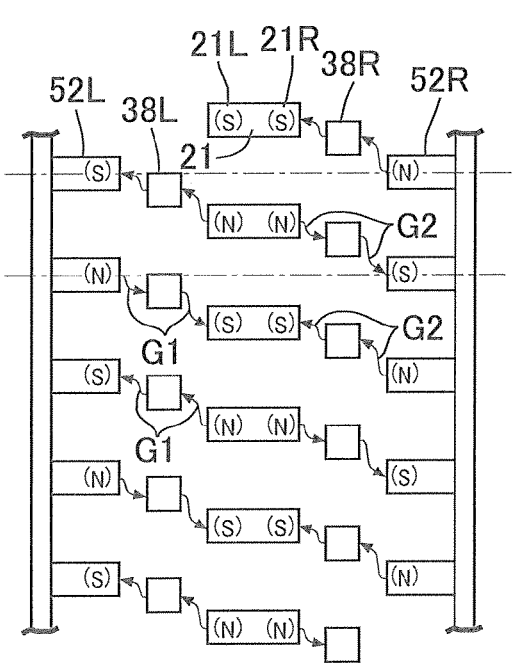

FIG.12
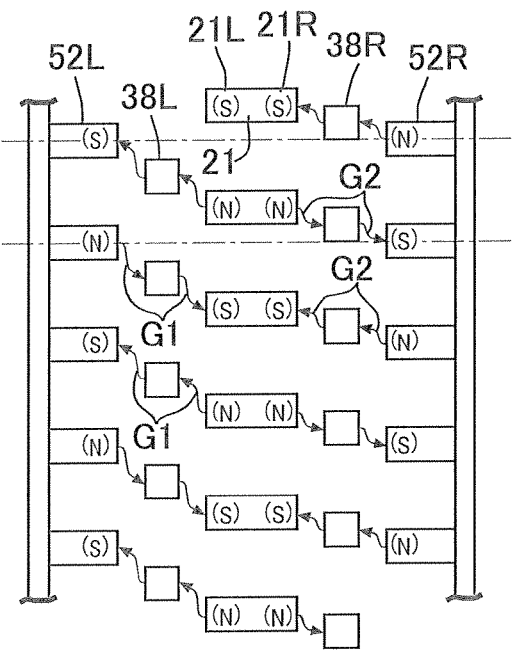
(E)
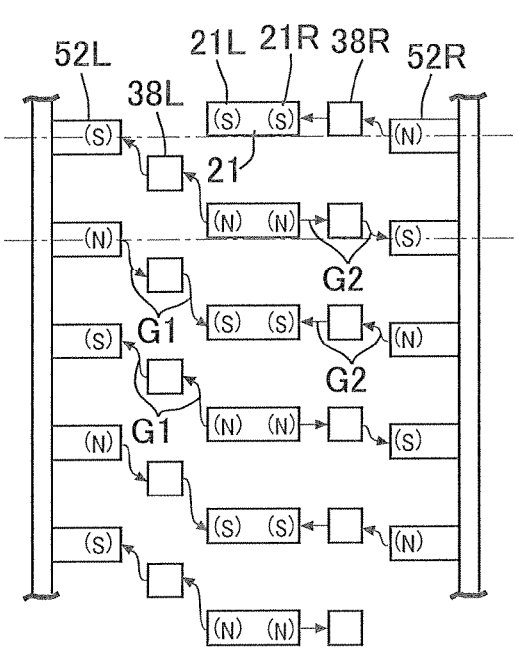
(F)
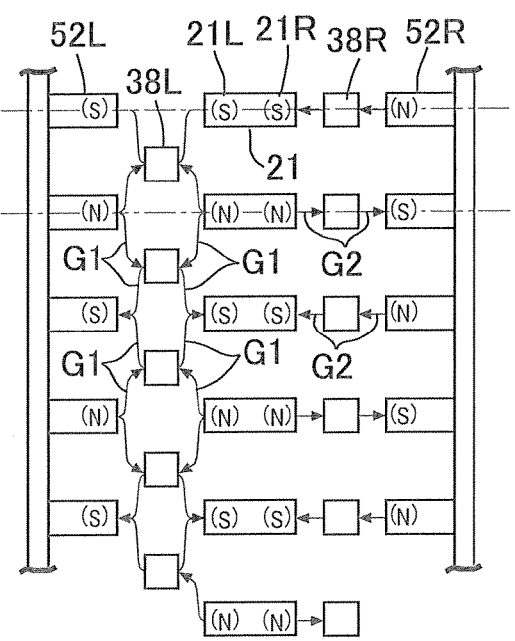
(G)

FIG.13
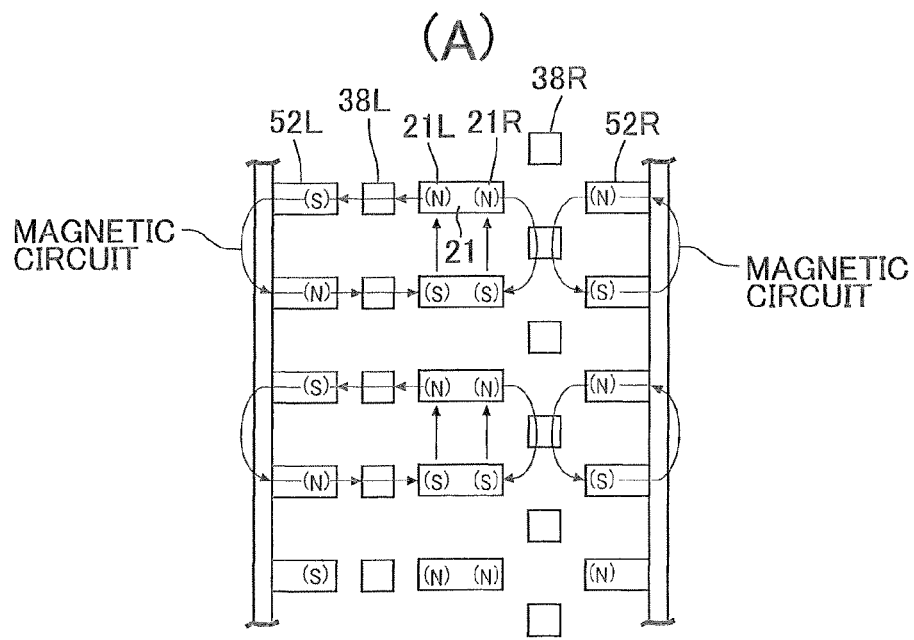
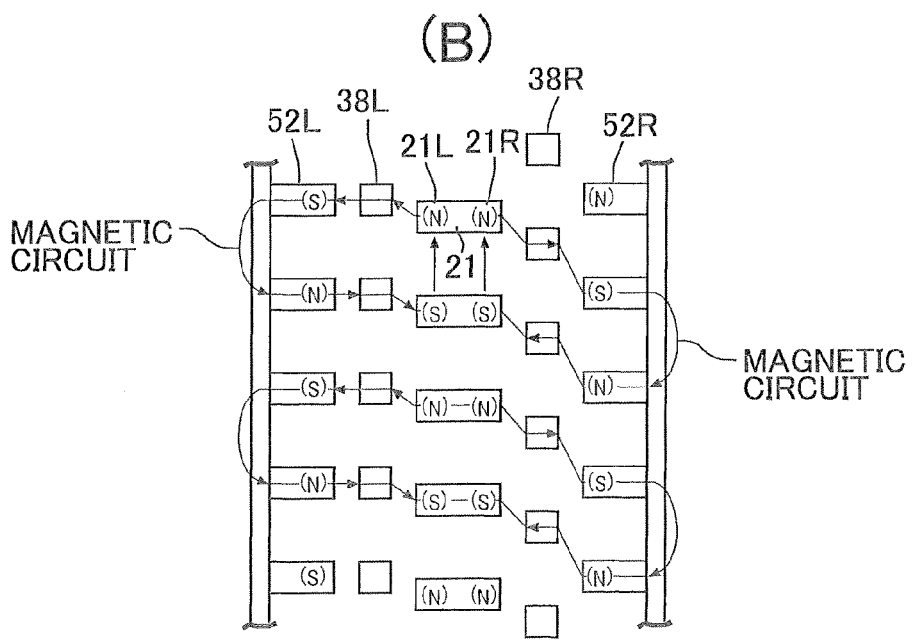

FIG.14
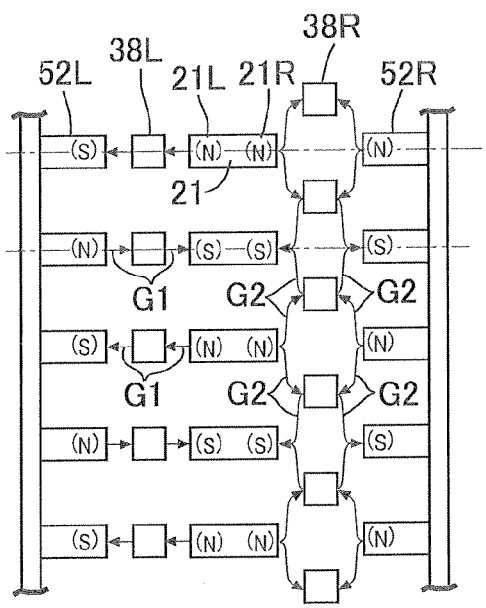
(A)
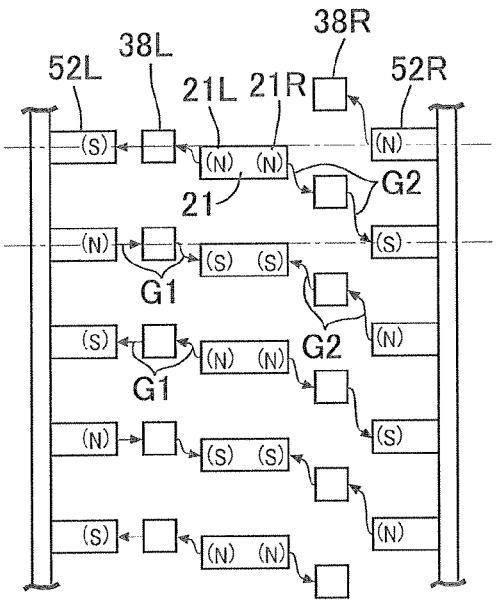
(B)
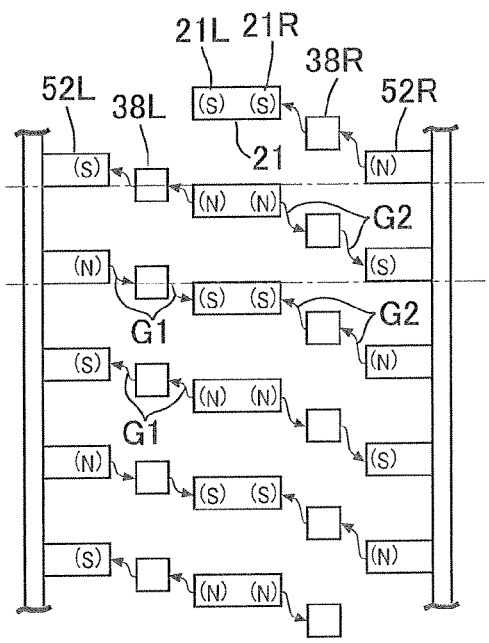
(C)
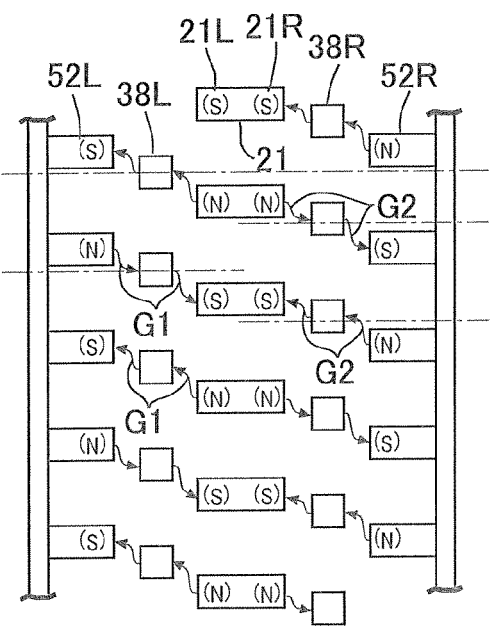
(D)

FIG.15
(E)
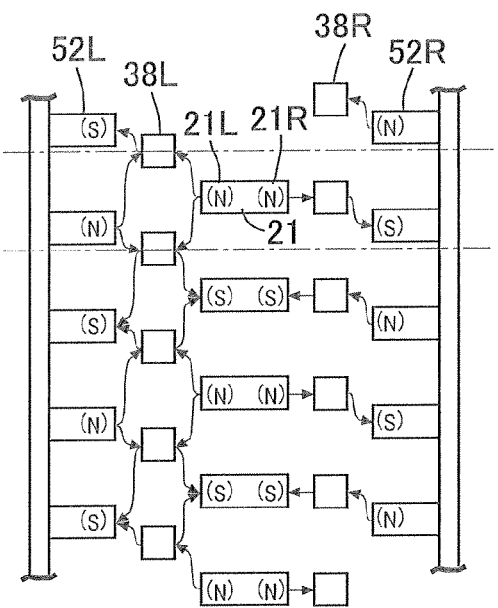
(F)
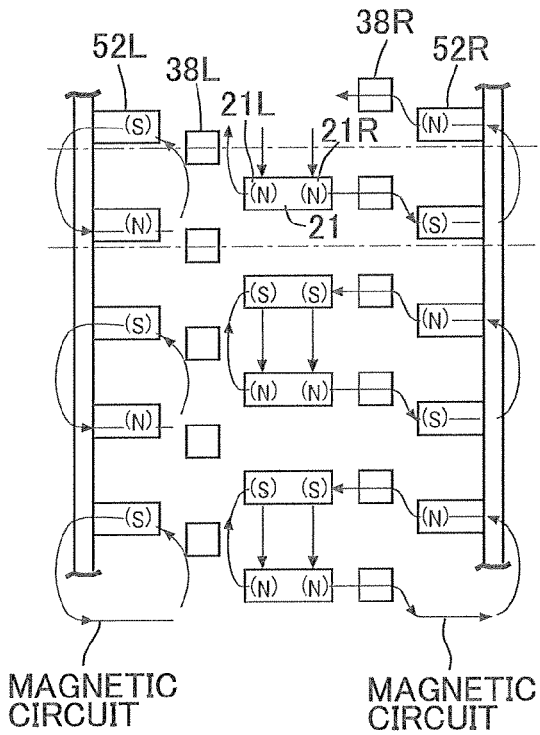
(G)
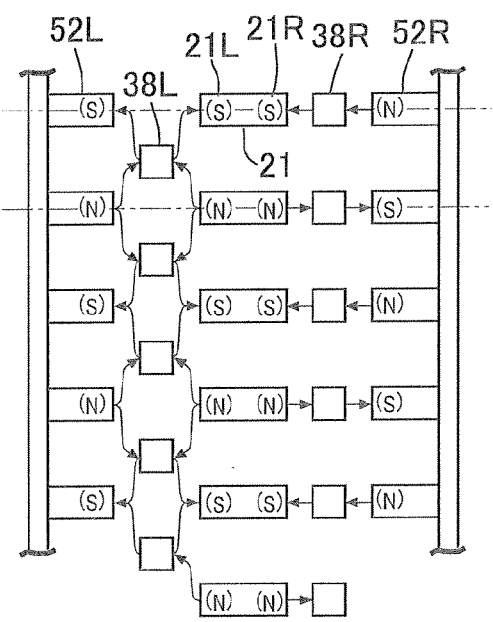

FIG.17
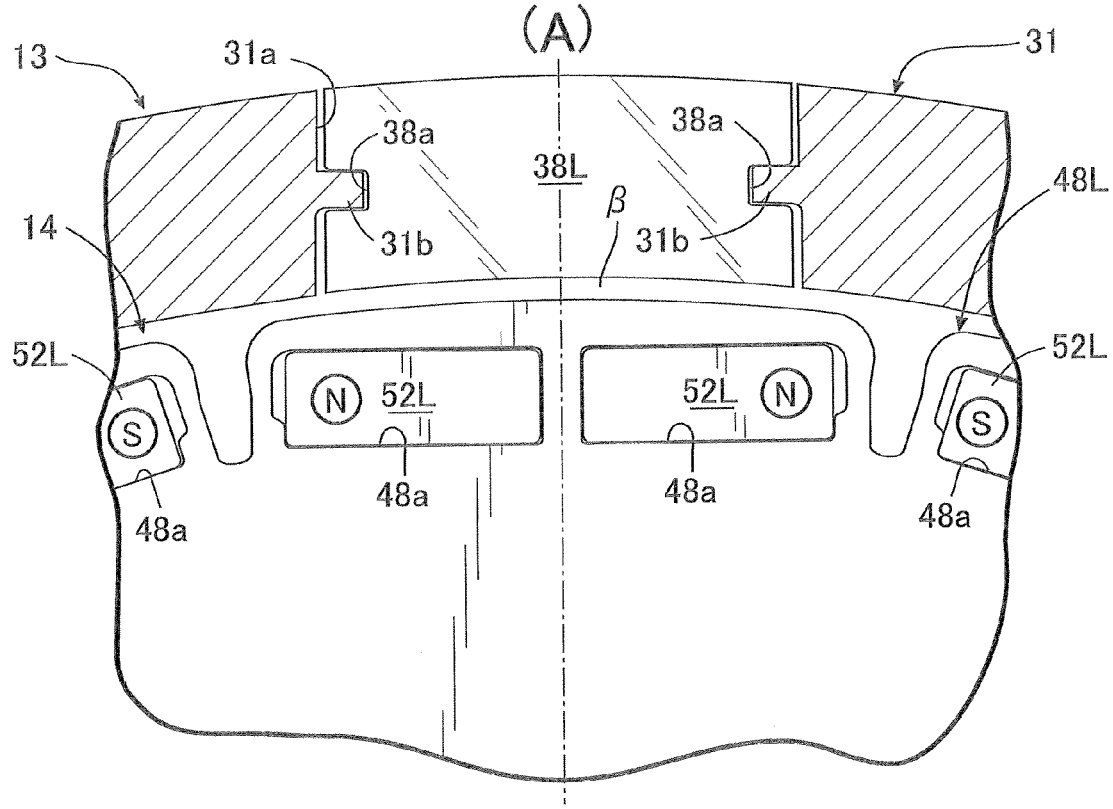
(A)
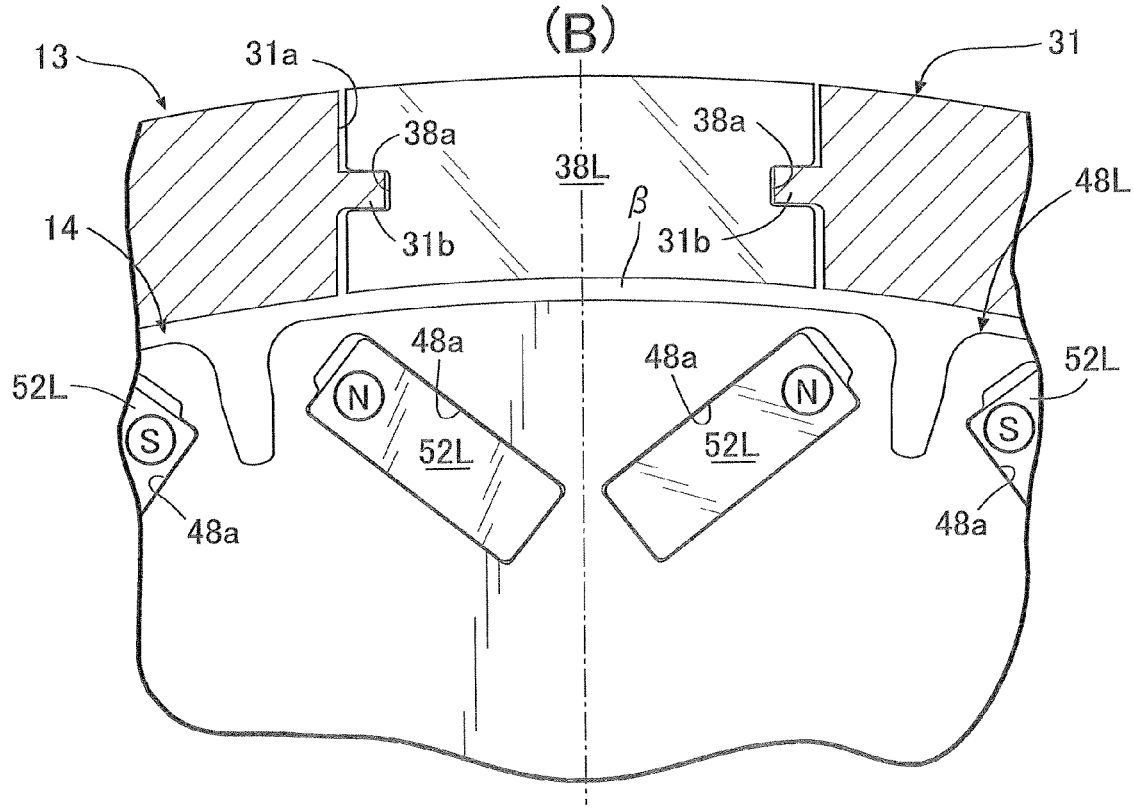
(B)

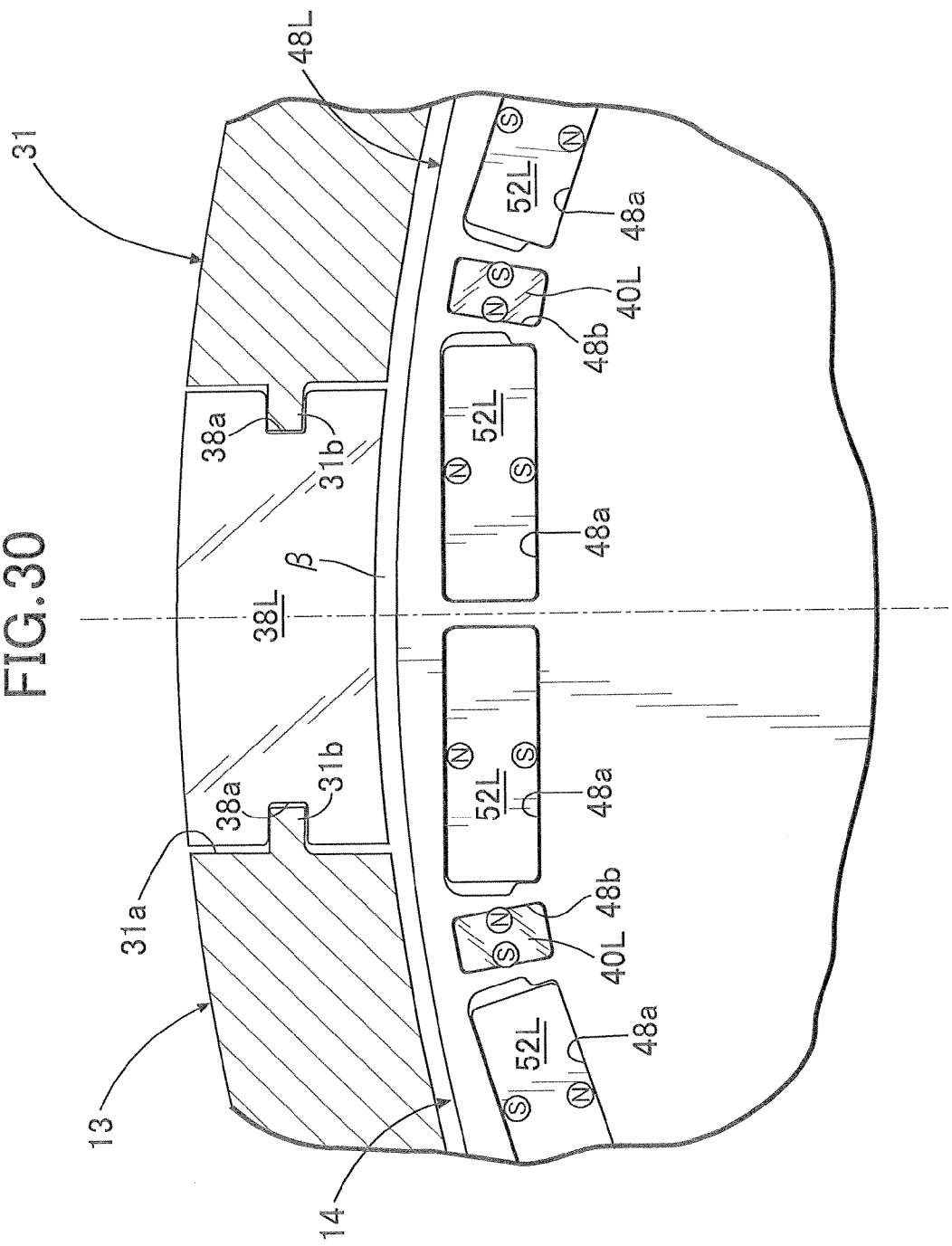

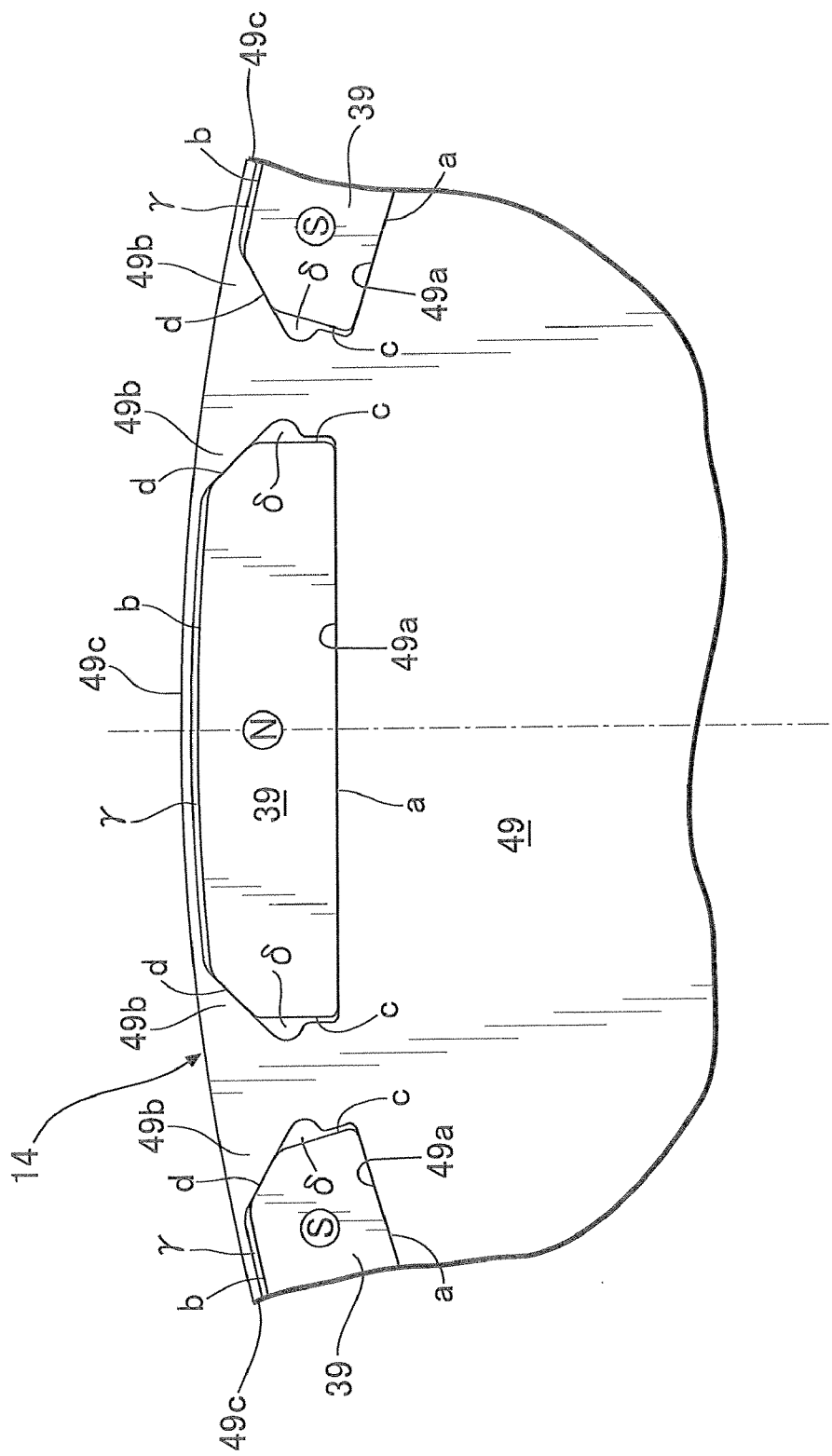

ELECTRIC MOTOR AND ROTOR FOR ROTATING ELECTRIC MACHINE

TECHNICAL FIELD

The present invention relates to an electric motor that includes an annular stator disposed so as to surround an axis, a first rotor that is rotatable around the axis, and a second rotor that is rotatable around the axis and is disposed between the stator and the first rotor. Furthermore, the present invention relates to a rotor for a rotating electric machine, and an electric motor employing the rotor for a rotating electric machine.

BACKGROUND ART

As a conventional electric motor, for example, one described in Patent Document 1 below is known. This electric motor has an inner rotor, a stator, and an outer rotor; the inner rotor has a columnar shape in which a plurality of permanent magnets extending slightly in a radial direction are disposed in the peripheral direction, the stator has a cylindrical shape in which a plurality of armatures are disposed in the peripheral direction and fixed by a resin mold, and the outer rotor is formed in a cylindrical shape by winding a coil around a core in which a plurality of rings are laminated, electric power not being supplied to this coil. Furthermore, the inner rotor, the stator, and the outer rotor are provided in order from the inside and are relatively rotatable.

In this electric motor, when electric power is supplied to the stator to thus generate a rotating magnetic field, the magnetic poles of the permanent magnets of the inner rotor are attracted to/repelled by the magnetic poles of the stator, the inner rotor thereby rotates in synchronization with the rotating magnetic field, and the outer rotor rotates out of synchronization with the rotating magnetic field by virtue of electromagnetic induction.

Furthermore, an arrangement in which a rotor of a permanent magnet type electric motor includes a first permanent magnet group and a second permanent magnet group that are adjacent to each other in the axial direction, the first and second permanent magnet groups each being formed by disposing a plurality of permanent magnets on an outer peripheral face of the rotor so that different magnetization directions alternate, and the direction of magnetization of a permanent magnet of the first permanent magnet group is different from that of an axially adjacent permanent magnet of the second permanent magnet group is known from Patent Document 2 below.

Furthermore, an arrangement in which a rotor of a stepping motor includes a first rotor portion to a fourth rotor portion arranged side by side in the axial direction, each rotor portion including a plurality of permanent magnets for which the polarity alternatingly reverses in the circumferential direction, the polarity of the permanent magnets is displaced by ½ pitch in the circumferential direction between the first rotor portion and the second rotor portion, the polarity of the permanent magnets is displaced by ½ pitch in the circumferential direction between the third rotor portion and the fourth rotor portion, and the polarity of the permanent magnets of the first and second rotor portions is displaced by ¼ pitch in the circumferential direction from the polarity of the permanent magnets of the third and fourth rotor portions is known from Patent Document 3 below (ref fifth embodiment in FIG. 12).

Patent Document 1: Japanese Patent Application Laid-open No. 11-341757
Patent Document 2: Japanese Patent Application Laid-open No. 2007-129869
Patent Document 3: Japanese Patent Application Laid-open No. 9-9602

DISCLOSURE OF INVENTION

Problems to be Solved by the Invention

Incidentally, the electric motor described in Patent Document 1 has the problem that high efficiency cannot be obtained since it functions not as a synchronous machine but as an induction machine due to the outer rotor being rotated by virtue of electromagnetic induction. Furthermore, since the outer rotor is rotated by virtue of electromagnetic induction, the outer rotor produces heat due to induced current generated in the coil of the outer rotor and eddy current generated in the core of the outer rotor, and it is necessary to cool the outer rotor.

In order to solve these problems, the present applicant has proposed a novel electric motor in Japanese Patent Application No. 2007-026422.

This electric motor includes an annular stator disposed so as to surround an axis, an inner rotor that is rotatable around the axis, and an outer rotor that is rotatable around the axis and is disposed between the stator and the inner rotor; the stator is formed by arranging side by side a first row of armatures that is formed from a plurality of first armatures and generates a first rotating magnetic field that rotates along the circumferential direction, and a second row of armatures that is formed from a plurality of second armatures and generates a second rotating magnetic field that rotates along the circumferential direction, the inner rotor is formed by arranging side by side a first row of permanent magnets that is formed from a plurality of first permanent magnets and a second row of permanent magnets that is formed from a plurality of second permanent magnets, and the outer rotor is formed by arranging side by side in the axial direction a first row of induced magnetic poles that is formed from a plurality of first induced magnetic poles made of a soft magnetic material and a second row of induced magnetic poles that is formed from a plurality of second induced magnetic poles made of a soft magnetic material, the first row of armatures and the first row of permanent magnets facing respective radially opposite sides of the first row of induced magnetic poles, and the second row of armatures and the second row of permanent magnets facing respective radially opposite sides of the second row of induced magnetic poles.

However, the electric motor proposed by Japanese Patent Application No. 2007-026422 has the problem that, since the phase of the first row of armatures and the phase of the second row of armatures of the stator are displaced by half a pitch (electrical angle 90°), the structure of the stator becomes complicated.

Furthermore, magnetic flux is passed between the permanent magnet of the rotor of the electric motor and the armature of the stator, which faces the permanent magnet, and if, among a plurality of permanent magnets provided on the rotor, magnetic flux is short circuited between two adjacent permanent magnets with magnetic poles having different polarity, there is the problem that the magnetic flux passed between the permanent magnet of the rotor and the armature of the stator might decrease, thus reducing the torque generated by the electric motor.

The present invention has been accomplished in light of the above-mentioned circumstances, and it is a first object thereof to simplify the structure of a stator of an electric motor equipped with a row of armatures that generates a rotating magnetic field.

Furthermore, a second object of the present invention is to improve the performance of a rotating electric machine by suppressing short circuiting of surface magnetic flux between a plurality of permanent magnets provided on a rotor for a rotating electric machine.

Means for Solving the Problems

In order to attain the first object, according to a first aspect of the present invention, there is provided an electric motor comprising an annular stator disposed so as to surround an axis, a first rotor that is rotatable around the axis, and a second rotor that is rotatable around the axis and is disposed between the stator and the first rotor, wherein the stator is formed by arranging side by side in a direction of the axis a first row of armatures and a second row of armatures, the first row of armatures comprising a plurality of first armatures disposed in the circumferential direction and generating a first rotating magnetic field that rotates along the circumferential direction by means of magnetic poles generated by the plurality of first armatures in response to the supply of electric power, and the second row of armatures comprising a plurality of second armatures disposed in the circumferential direction and generating a second rotating magnetic field that rotates along the circumferential direction by means of magnetic poles generated by the plurality of second armatures in response to the supply of electric power, the first rotor is formed by arranging side by side in the axis direction a first row of permanent magnets and a second row of permanent magnets, the first row of permanent magnets comprising a plurality of first permanent magnets disposed so as to have magnetic poles with different polarities alternating at a predetermined pitch in the circumferential direction, and the second row of permanent magnets comprising a plurality of second permanent magnets disposed so as to have magnetic poles with different polarities alternating at the predetermined pitch in the circumferential direction, the second rotor is formed by arranging side by side in the axis direction a first row of induced magnetic poles and a second row of induced magnetic poles, the first row of induced magnetic poles comprising a plurality of first induced magnetic poles, made of a soft magnetic material, disposed at the predetermined pitch in the circumferential direction, and the second row of induced magnetic poles comprising a plurality of second induced magnetic poles, made of a soft magnetic material, disposed at the predetermined pitch in the circumferential direction, the first row of armatures and the first row of permanent magnets face respective radially opposite sides of the first row of induced magnetic poles, the second row of armatures and the second row of permanent magnets face respective radially opposite sides of the second row of induced magnetic poles, the phase of the polarity of the first rotating magnetic field and the phase of the polarity of the second rotating magnetic field of the stator coincide with each other, the phase of the first induced magnetic pole and the phase of the second induced magnetic pole of the second rotor are displaced from each other by only half of the predetermined pitch in the circumferential direction, and the phase of the magnetic pole of the first row of permanent magnets and the phase of the magnetic pole of the second row of permanent magnets of the first rotor are displaced by only the predetermined pitch in the circumferential direction.

Furthermore, according to a second aspect of the present invention, there is provided an electric motor comprising an annular stator disposed so as to surround an axis, a first rotor that is rotatable around the axis, and a second rotor that is rotatable around the axis and is disposed between the stator and the first rotor, wherein the stator is formed from a row of armatures comprising a plurality of armatures disposed in the circumferential direction and generating a rotating magnetic field that rotates along the circumferential direction by means of magnetic poles generated by the plurality of armatures in response to the supply of electric power, the first rotor is formed by arranging side by side in a direction of the axis a first row of permanent magnets and a second row of permanent magnets, the first row of permanent magnets comprising a plurality of first permanent magnets disposed so as to have magnetic poles with different polarities alternating at a predetermined pitch in the circumferential direction, and the second row of permanent magnets comprising a plurality of second permanent magnets disposed so as to have magnetic poles with different polarities alternating at the predetermined pitch in the circumferential direction, the second rotor is formed by arranging side by side in the axis direction a first row of induced magnetic poles and a second row of induced magnetic poles, the first row of induced magnetic poles comprising a plurality of first induced magnetic poles, made of a soft magnetic material, disposed at the predetermined pitch in the circumferential direction, and the second row of induced magnetic poles comprising a plurality of second induced magnetic poles, made of a soft magnetic material, disposed at the predetermined pitch in the circumferential direction, the row of armatures and the first row of permanent magnets face respective radially opposite sides of the first row of induced magnetic poles, the row of armatures and the second row of permanent magnets face respective radially opposite sides of the second row of induced magnetic poles, the phase of the first induced magnetic pole and the phase of the second induced magnetic pole of the second rotor are displaced by only half of the predetermined pitch in the circumferential direction, and the phase of the magnetic pole of the first row of permanent magnets and the phase of the magnetic pole of the second row of permanent magnets of the first rotor are displaced by only the predetermined pitch in the circumferential direction.

Moreover, according to a third aspect of the present invention, in addition to the first or second aspect, there is provided the electric motor, wherein a plurality of slits extending linearly in the axis direction are formed in a cylindrical rotor body of the second rotor, and the first and second induced magnetic poles are fitted into the slits.

In order to attain the second object, according to a fourth aspect of the present invention, there is provided a rotor for a rotating electric machine in which a plurality of rows of magnetic poles, having a plurality of main permanent magnets disposed so that magnetic poles with different polarities are alternatingly arranged in the circumferential direction, are arranged side by side in a direction of an axis, and the mutually opposing main permanent magnets of the rows of magnetic poles that are adjacent in the axis direction are made to have different polarities, wherein an auxiliary permanent magnet is provided between the main permanent magnets, of the two adjacent rows of magnetic poles, that are mutually opposing in the axis direction, and the polarity of the auxiliary permanent magnet is disposed so as to suppress short circuiting of surface magnetic flux between the mutually opposing main permanent magnets.

Moreover, according to a fifth aspect of the present invention, in addition to the fourth aspect, there is provided the rotor for a rotating electric machine, wherein a demagnetization resistance of the auxiliary permanent magnet is set larger than a demagnetization resistance of the main permanent magnet.

Furthermore, according to a sixth aspect of the present invention, in addition to the fourth or fifth aspect, there is provided the rotor for a rotating electric machine, wherein the auxiliary permanent magnet is made to project further toward the stator side than the main permanent magnet.

Moreover, according to a seventh aspect of the present invention, in addition to the fourth or fifth aspect there is provided the rotor for a rotating electric machine, wherein the auxiliary permanent magnet is supported on an outer peripheral part of a spacer, made of a weakly magnetic material, disposed between the plurality of rows of magnetic poles.

Furthermore, according to an eighth aspect of the present invention, in addition to the seventh aspect, there is provided the rotor for a rotating electric machine, wherein the auxiliary permanent magnet comprises: an inner peripheral face and an outer peripheral face that extend in the circumferential direction relative to the axis; a pair of side faces that extend in the radial direction relative to the axis; and a pair of inclined faces that connect radially outer end parts of the pair of side faces and circumferentially opposite end parts of the outer peripheral face, an auxiliary permanent magnet support hole is formed in an outer peripheral part of the spacer, the auxiliary permanent magnet being fitted into the auxiliary permanent magnet support hole, and at least the pair of inclined faces of the auxiliary permanent magnet are in contact with a pair of radial load-supporting portions in the area around the auxiliary permanent magnet support hole.

Moreover, according to a ninth aspect of the present invention, in addition to the eighth aspect, there is provided the rotor for a rotating electric machine, wherein the spacer comprises a bridge portion connecting the pair of radial load-supporting portions, and the bridge portion faces the outer peripheral face of the auxiliary permanent magnet across a gap.

Furthermore, according to a tenth aspect of the present invention, there is provided a rotor for a rotating electric machine in which a plurality of rows of magnetic poles, having a plurality of main permanent magnets disposed so that magnetic poles with different polarities are alternatingly arranged in the circumferential direction, are arranged side by side in an axis direction, and the mutually opposing main permanent magnets of the rows of magnetic poles that are adjacent in the axis direction are made to have different polarities, wherein an auxiliary permanent magnet is provided between the main permanent magnets that are mutually opposing in the circumferential direction, and the polarity of the auxiliary permanent magnet is disposed so as to suppress short circuiting of surface magnetic flux between the mutually opposing main permanent magnets.

Moreover, according to an eleventh aspect of the present invention, in addition to the tenth aspect, there is provided the rotor for a rotating electric machine, wherein a demagnetization resistance of the auxiliary permanent magnet is set larger than a demagnetization resistance of the main permanent magnet.

Furthermore, according to a twelfth aspect of the present invention, in addition to the tenth or eleventh aspect, there is provided the rotor for a rotating electric machine, wherein the auxiliary permanent magnet is made to project further toward the stator side than the main permanent magnet.

Moreover, according to a thirteenth aspect of the present invention, there is provided an electric motor comprising the rotor for a rotating electric machine according to any one of the fourth, fifth, tenth, and eleventh aspects as a first rotor, wherein the electric motor comprises a second rotor between the first rotor and a stator, the stator comprises a plurality of armatures disposed in the circumferential direction, and generates a rotating magnetic field that rotates along the circumferential direction by means of magnetic poles generated in the plurality of armatures in response to the supply of electric power, the first rotor is formed by arranging side by side in the axis direction a first row of permanent magnets and a second row of permanent magnets, the first row of permanent magnets comprising a plurality of first permanent magnets disposed so as to have magnetic poles with different polarities alternating at a predetermined pitch in the circumferential direction, and the second row of permanent magnets comprising a plurality of second permanent magnets disposed so as to have magnetic poles with different polarities alternating at the predetermined pitch in the circumferential direction, the second rotor is formed by arranging side by side in the axis direction a first row of induced magnetic poles and a second row of induced magnetic poles, the first row of induced magnetic poles comprising a plurality of first induced magnetic poles, made of a soft magnetic material, disposed at the predetermined pitch in the circumferential direction, and the second row of induced magnetic poles comprising a plurality of second induced magnetic poles, made of a soft magnetic material, disposed at the predetermined pitch in the circumferential direction, the row of armatures of the stator and the first row of permanent magnets face respective radially opposite sides of the first row of induced magnetic poles, and the row of armatures of the stator and the second row of permanent magnets face respective radially opposite sides of the second row of induced magnetic poles, the phase of the first induced magnetic pole and the phase of the second induced magnetic pole of the second rotor is displaced from each other by only half of the predetermined pitch in the circumferential direction, and the phase of the magnetic pole of the first row of permanent magnets and the phase of the magnetic pole of the second row of permanent magnets of the first rotor is displaced by only the predetermined pitch in the circumferential direction.

Here, an outer rotor 13 of embodiments corresponds to the second rotor of the present invention, an inner rotor 14 of the embodiments corresponds to the first rotor of the present invention, first and second stators 12L and 12R of the embodiments correspond to the stator of the present invention, first and second armatures 21L and 21R of the embodiments correspond to the armature of the present invention, first and second induced magnetic poles 38L and 38R of the embodiments correspond to the induced magnetic pole of the present invention, first and second auxiliary permanent magnets 40L and 40R of the embodiments correspond to the auxiliary permanent magnet of the present invention, and first and second main permanent magnets 52L and 52R of the embodiments correspond to the main permanent magnet of the present invention.

Effects of the Invention

In accordance with the first aspect of the present invention, since the electric motor includes the annular stator that generates first and second rotating magnetic fields by means of the first and second rows of armatures disposed so as to surround the axis, the first rotor that is rotatable around the axis and has the first and second rows of permanent magnets formed from the first and second permanent magnets, and the second rotor, disposed between the stator and the first rotor, that is rotatable around the axis and has the first and second rows of induced magnetic poles formed from the first and second induced magnetic poles, the first row of armatures and the first row of permanent magnets face respective radially opposite sides of the first row of induced magnetic poles, and the second row of armatures and the second row of permanent magnets face respective radially opposite sides of the second row of induced magnetic poles, it is possible, by controlling energization of the first and second armatures so as to rotate the first and second rotating magnetic fields, to form a magnetic path that passes through the first and second armatures, the first and second permanent magnets, and the first and second induced magnetic poles, thereby rotating one or both of the first rotor and the second rotor.

In this arrangement, by displacing the phases of the first and second induced magnetic poles of the second rotor from each other by only half of the predetermined pitch and displacing the phases of the magnetic poles of the first and second rows of permanent magnets of the first rotor from each other by only the predetermined pitch, the phases of the polarities of the first and second rotating magnetic fields of the stator can be made to coincide with each other, thus enabling the first and second rows of armatures to be disposed in the same phase and the structure of the stator to be simplified.

In accordance with the second aspect of the present invention, since the electric motor includes the annular stator that generates a rotating magnetic field by means of the row of armatures disposed so as to surround the axis, the first rotor that is rotatable around the axis and has the first and second rows of permanent magnets formed from the first and second permanent magnets, and the second rotor, disposed between the stator and the first rotor, that is rotatable around the axis and has the first and second rows of induced magnetic poles formed from the first and second induced magnetic poles, the row of armatures and the first row of permanent magnets face respective radially opposite sides of the first row of induced magnetic poles, and the row of armatures and the second row of permanent magnets face respective radially opposite sides of the second row of induced magnetic poles, it is possible, by controlling energization of the armatures so as to rotate the rotating magnetic field, to form a magnetic path that passes through the armature, the first and second permanent magnets, and the first and second induced magnetic poles, thereby rotating one or both of the first rotor and the second rotor.

In this arrangement, by displacing the phases of the first and second induced magnetic poles of the second rotor from each other by only half of the predetermined pitch and displacing the phases of the magnetic poles of the first and second rows of permanent magnets of the first rotor from each other by only the predetermined pitch, the polarity of the rotating magnetic field of the stator with respect to the first induced magnetic poles and the first permanent magnets and the polarity of the rotating magnetic field of the stator with respect to the second induced magnetic poles and the second permanent magnets can be made to coincide with each other, thus enabling the number of rows of armatures to be reduced to one and the structure of the stator to be simplified.

In accordance with the third aspect of the present invention, since the first and second induced magnetic poles are fitted into the plurality of slits provided in the rotor body of the second rotor so as to extend in the axial direction, assembly of the first and second induced magnetic poles on the rotor body becomes easy.

In accordance with the fourth aspect of the present invention, since the rotor for a rotating electric machine is arranged so that the plurality of rows of magnetic poles, having the plurality of main permanent magnets disposed so that magnetic poles with different polarities are alternatingly disposed in the circumferential direction, are arranged side by side in the axial direction, and the mutually opposing main permanent magnets of the rows of magnetic poles that are adjacent in the axial direction are made to have different polarities, and the polarities of the auxiliary permanent magnets provided between the main permanent magnets, of the two adjacent rows of magnetic poles, that are mutually opposing in the axial direction are disposed so as to suppress short circuiting of surface magnetic flux between the mutually opposing main permanent magnets, short circuiting of the surface magnetic flux between the main permanent magnets can be suppressed by the magnetic flux of the auxiliary permanent magnet, thereby minimizing degradation of the performance of the rotating electric machine due to short circuiting of the surface magnetic flux.

In accordance with the fifth aspect of the present invention, since the demagnetization resistance of the auxiliary permanent magnet is set larger than the demagnetization resistance of the main permanent magnet, it becomes possible to suppress demagnetization of the auxiliary permanent magnet due to magnetic flux in the main permanent magnet, thus enabling an effect of suppressing short circuiting of the surface magnetic flux by the auxiliary permanent magnet to be exhibited sufficiently.

In accordance with the sixth aspect of the present invention, since the auxiliary permanent magnet is made to project further toward the stator than the main permanent magnet, it is possible to make the auxiliary permanent magnet project into a short circuit path of surface magnetic flux between the mutually opposing main permanent magnets, thus enabling an effect of suppressing short circuiting of the surface magnetic flux by the auxiliary permanent magnet to be exhibited effectively.

In accordance with the seventh aspect of the present invention, since the auxiliary permanent magnet is supported on the outer peripheral part of the spacer, made of a weakly magnetic material, disposed between the plurality of rows of magnetic poles, compared with a case in which this spacer is formed from laminated steel sheets, not only is the cost low, but it is also possible to further enhance by means of the spacer the effect of preventing short circuiting of the magnetic flux between the plurality of rows of magnetic poles by the auxiliary permanent magnet.

In accordance with the eighth aspect of the present invention, with regard to the auxiliary permanent magnet supported in the auxiliary permanent magnet support hole formed in the outer peripheral part of the spacer, since at least the pair of inclined faces are in contact with the pair of radial load-supporting portions around the auxiliary permanent magnet support hole, when a centrifugal force accompanying rotation of the rotor for a rotating electric machine acts on the auxiliary permanent magnet, the auxiliary permanent magnet can be positioned in the circumferential direction.

In accordance with the ninth aspect of the present invention, since the spacer includes the bridge portion connecting the pair of radial load-supporting portions, and the bridge portion faces the outer peripheral face of the auxiliary permanent magnet across the gap, it is possible to prevent effectively, by means of the bridge portion, stress due to centrifugal force from concentrating in the pair of radial load-supporting portions to thus cause the durability to degrade. In this arrangement, since the auxiliary permanent magnet gives an effect of preventing short circuiting of the magnetic flux between the plurality of rows of magnetic poles by means of the magnetic flux in the axial direction, even if there is a gap in the radial direction between the outer peripheral face of the auxiliary permanent magnet and the permanent magnet support hole, the effect of preventing short circuiting of the magnetic flux is not affected.

In accordance with the tenth aspect of the present invention, since the rotor for a rotating electric machine is arranged so that the plurality of rows of magnetic poles, having the plurality of main permanent magnets disposed so that magnetic poles with different polarities are alternatingly disposed in the circumferential direction, are arranged side by side in the axial direction, and the mutually opposing main permanent magnets of the rows of magnetic poles that are adjacent in the axial direction are made to have different polarities, and the polarities of the auxiliary permanent magnets provided between the main permanent magnets that are mutually opposing in the circumferential direction are disposed so as to suppress short circuiting of surface magnetic flux between the mutually opposing main permanent magnets, short circuiting of the surface magnetic flux between the main permanent magnets can be suppressed by the magnetic flux of the auxiliary permanent magnet, thereby minimizing degradation of the performance of the rotating electric machine due to short circuiting of the surface magnetic flux.

In accordance with the eleventh aspect of the present invention, since the demagnetization resistance of the auxiliary permanent magnet is set larger than the demagnetization resistance of the main permanent magnet, it becomes possible to suppress demagnetization of the auxiliary permanent magnet due to magnetic flux in the main permanent magnet, thus enabling an effect of suppressing short circuiting of the surface magnetic flux by the auxiliary permanent magnet to be exhibited sufficiently.

In accordance with the twelfth aspect of the present invention, since the auxiliary permanent magnet is made to project further toward the stator than the main permanent magnet, it is possible to make the auxiliary permanent magnet project into a short circuit path of surface magnetic flux between the mutually opposing main permanent magnets, thus enabling an effect of suppressing short circuiting of the surface magnetic flux by the auxiliary permanent magnet to be exhibited effectively.

Furthermore, in accordance with the thirteenth aspect of the present invention, since the electric motor includes the stator that generates a rotating magnetic field by means of the row of armatures, the first rotor that has the first and second rows of permanent magnets formed from the first and second permanent magnets, and the second rotor, disposed between the stator and the first rotor, that has the first and second rows of induced magnetic poles formed from the first and second induced magnetic poles, the row of armatures and the first row of permanent magnets face respective radially opposite sides of the first row of induced magnetic poles, and the row of armatures and the second row of permanent magnets face respective radially opposite sides of the second row of induced magnetic poles, it is possible, by controlling energization of the armatures so as to rotate the rotating magnetic field, to form a magnetic path that passes through the first and second armatures, the first and second permanent magnets, and the first and second induced magnetic poles, thereby rotating one or both of the first rotor and the second rotor.

BRIEF DESCRIPTION OF DRAWINGS

FIG. 11 is part 1 of a diagram for explaining the operation when the inner rotor is fixed (first embodiment).

FIG. 12 is part 2 of a diagram for explaining the operation when the inner rotor is fixed (first embodiment).

FIG. 13 is part 3 of a diagram for explaining the operation when the inner rotor is fixed (first embodiment).

FIG. 14 is part 1 of a diagram for explaining the operation when the outer rotor is fixed (first embodiment).

FIG. 15 is part 2 of a diagram for explaining the operation when the outer rotor is fixed (first embodiment).

FIG. 17 is a view corresponding to FIG. 9 above (third embodiment).

FIG. 30 is a view corresponding to FIG. 26 above (seventh embodiment).

FIG. 31 is an enlarged view of an essential part of a spacer (eighth embodiment).

EXPLANATION OF REFERENCE NUMERALS AND SYMBOLS

12 Stator
12L First stator (stator)
12R Second stator (stator)
13 Outer rotor (second rotor)

14 Inner rotor (first rotor)
21 Armature
21L First armature (armature)
21R Second armature (armature)
31 Rotor body
31a Slit
31b Slit
38L First induced magnetic pole (induced magnetic pole)
38R Second induced magnetic pole (induced magnetic pole)
39 Auxiliary permanent magnet
40L First auxiliary permanent magnet (auxiliary permanent magnet)
40R Second auxiliary permanent magnet (auxiliary permanent magnet)
49 Spacer
49a Auxiliary permanent magnet support hole
49b Radial load-supporting portion
49c Bridge portion
52L First permanent magnet (first main permanent magnet, main permanent magnet)
52R Second permanent magnet (second main permanent magnet, main permanent magnet)
a Inner peripheral face
b Outer peripheral face
c Side face
d Inclined face
L Axis
P Fixed pitch
γ Gap

BEST MODE FOR CARRYING OUT THE INVENTION

Modes for carrying out the present invention are explained below by reference to the attached drawings.

First Embodiment

A first embodiment of the present invention is first explained by reference to FIG. 1 to FIG. 15.

Figure 7:
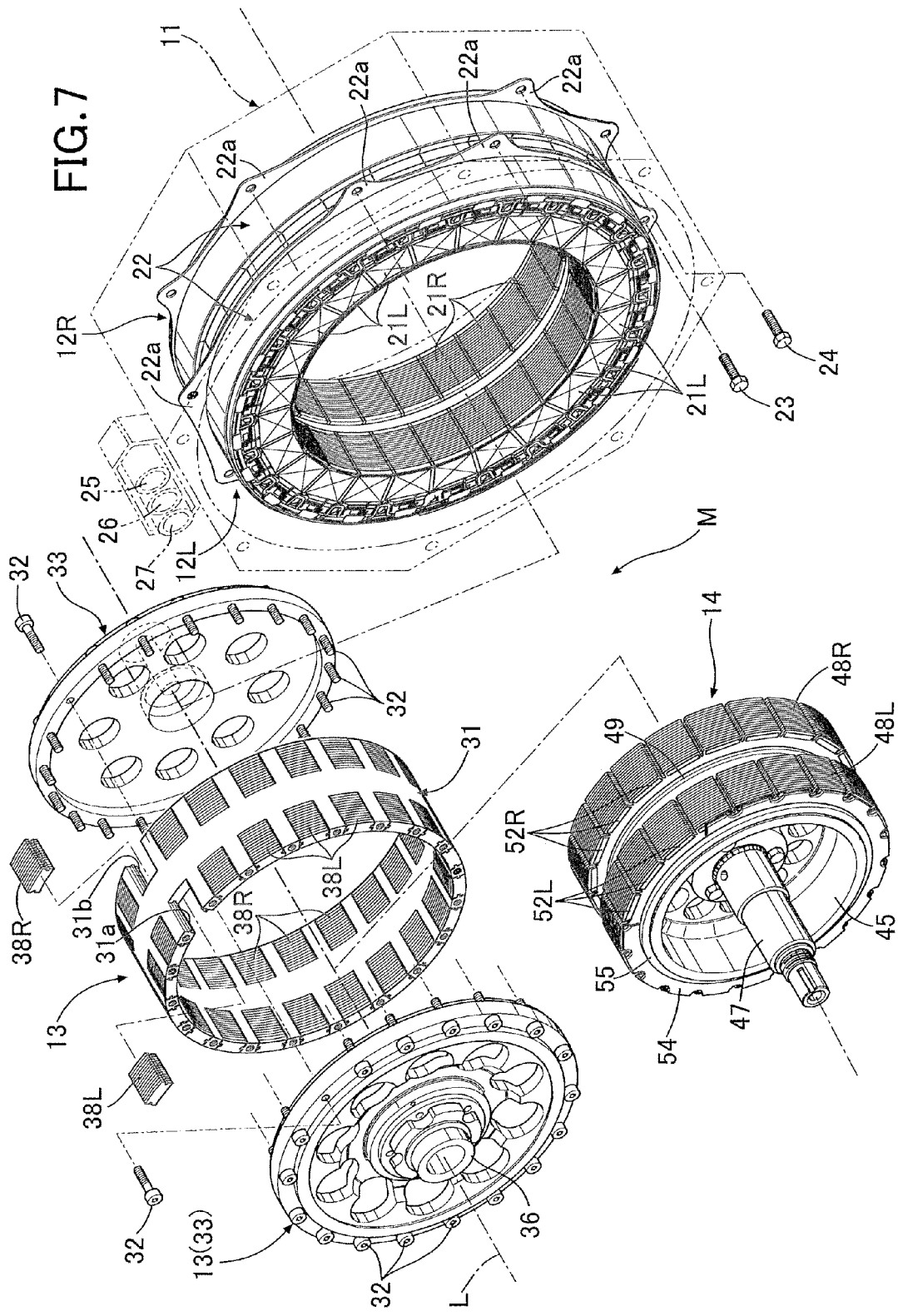
FIG. 7 is an exploded perspective view of the electric motor (first embodiment).
Figure 8:
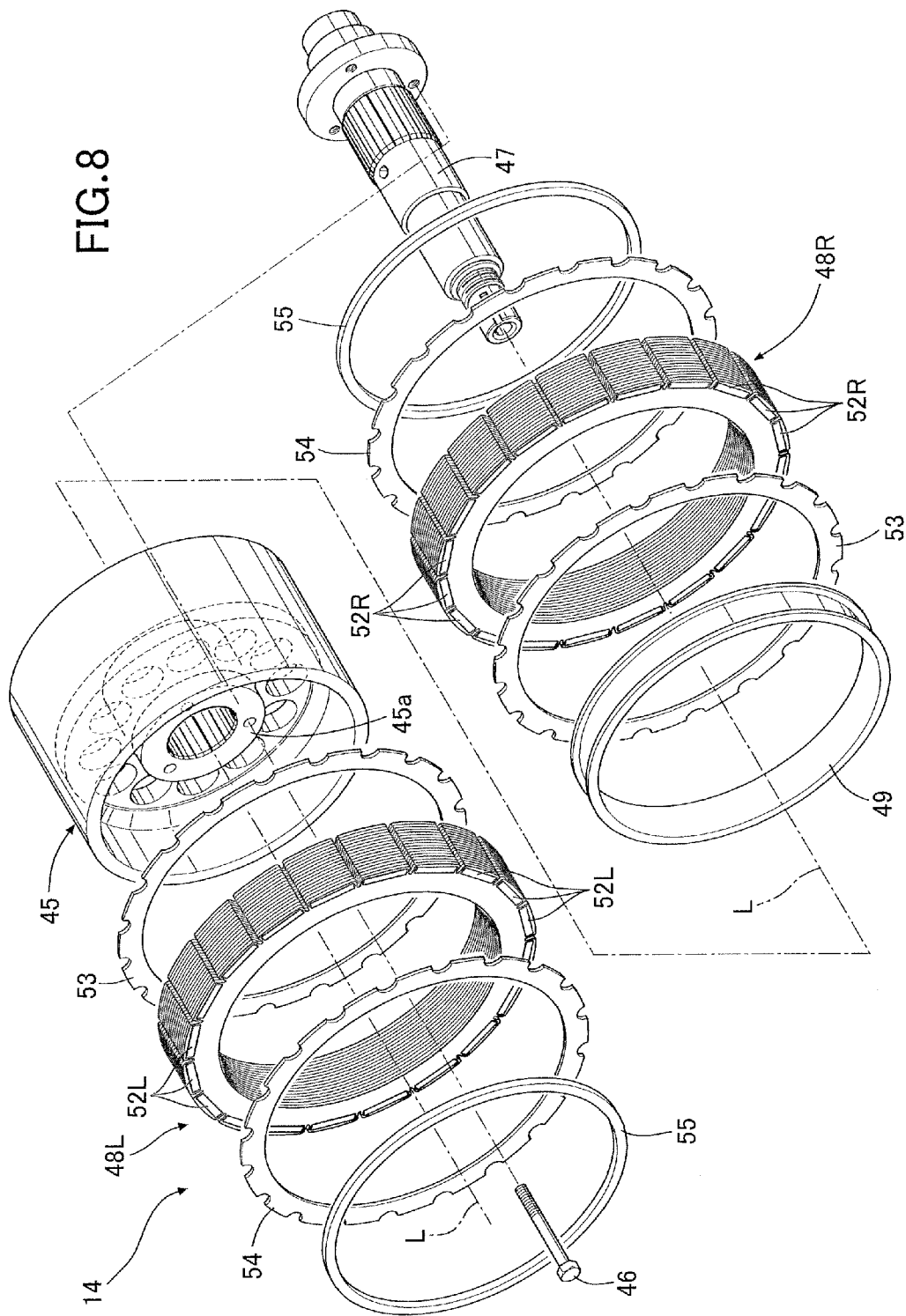
FIG. 8 is an exploded perspective view of an inner rotor (first embodiment).

As shown in FIG. 7, an electric motor M of the present embodiment is formed from a casing 11 forming an octagonal tubular shape that is short in a direction of an axis L, annular first and second stators 12L and 12R fixed to the inner periphery of the casing 11, a cylindrical outer rotor 13 that is housed in the interior of the first and second stators 12L and 12R and rotates around the axis L, and a cylindrical inner rotor 14 that is housed in the interior of the outer rotor 13 and rotates around the axis L; the outer rotor 13 and the inner rotor 14 can rotate relative to the fixed first and second stators 12L and 12R, and the outer rotor 13 and the inner rotor 14 can rotate relative to each other.

Figure 1:
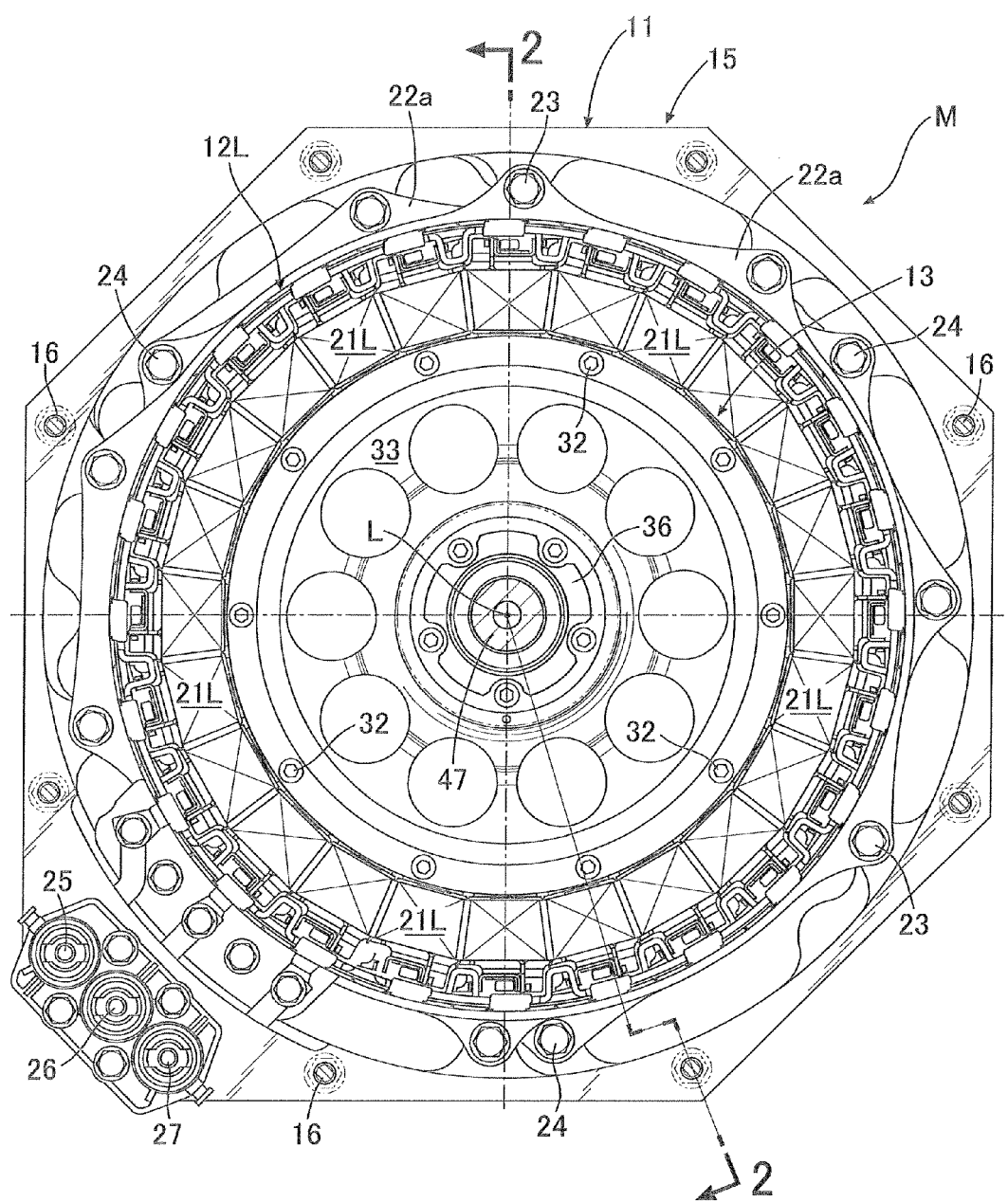
FIG. 1 is a front view in the axial direction, corresponding to a view from arrowed line 1-1 in FIG. 2, of an electric motor (first embodiment).
Figure 2:
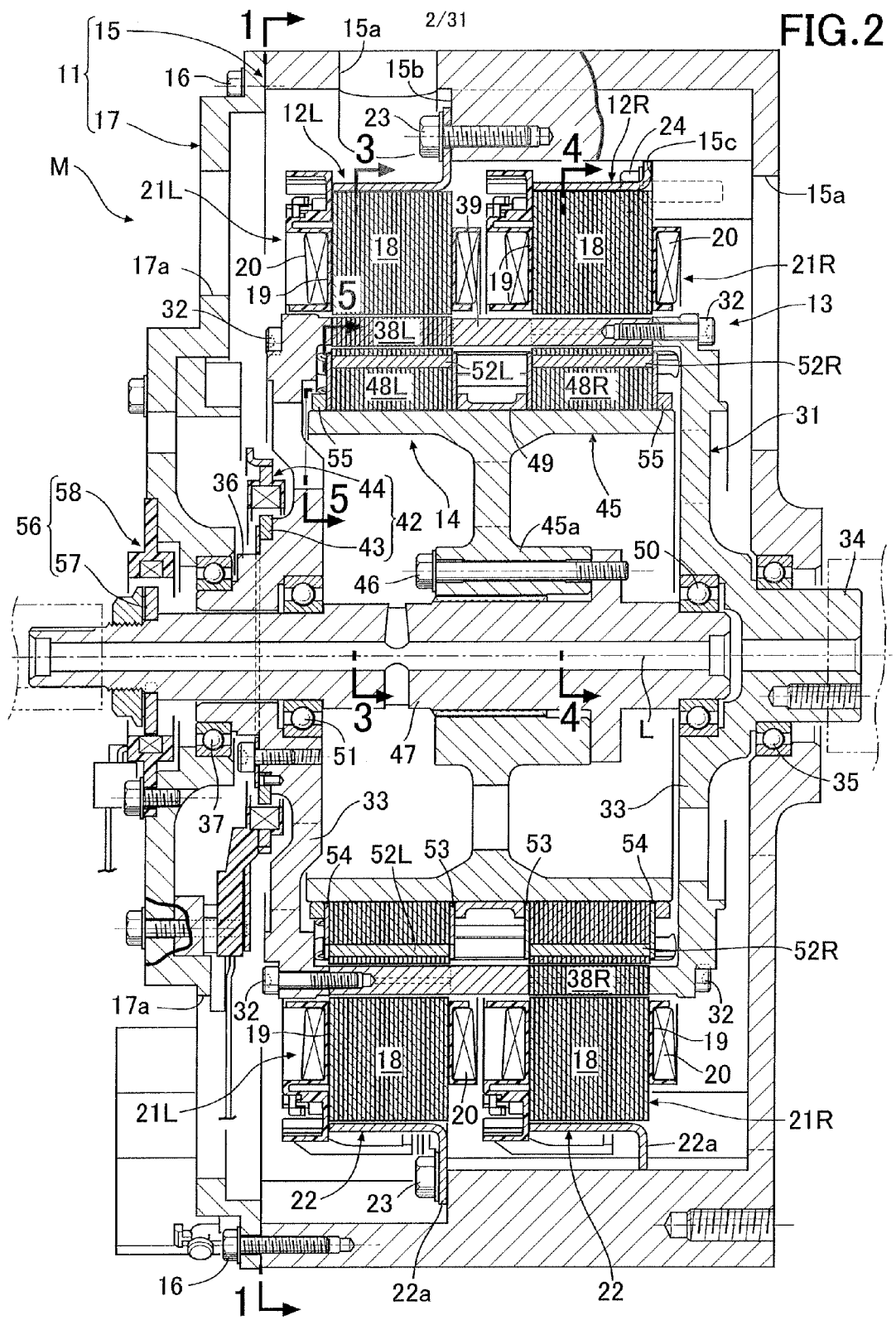
FIG. 2 is a cross-sectional view taken along line 2-2 in FIG. 1 (first embodiment).
Figure 3:
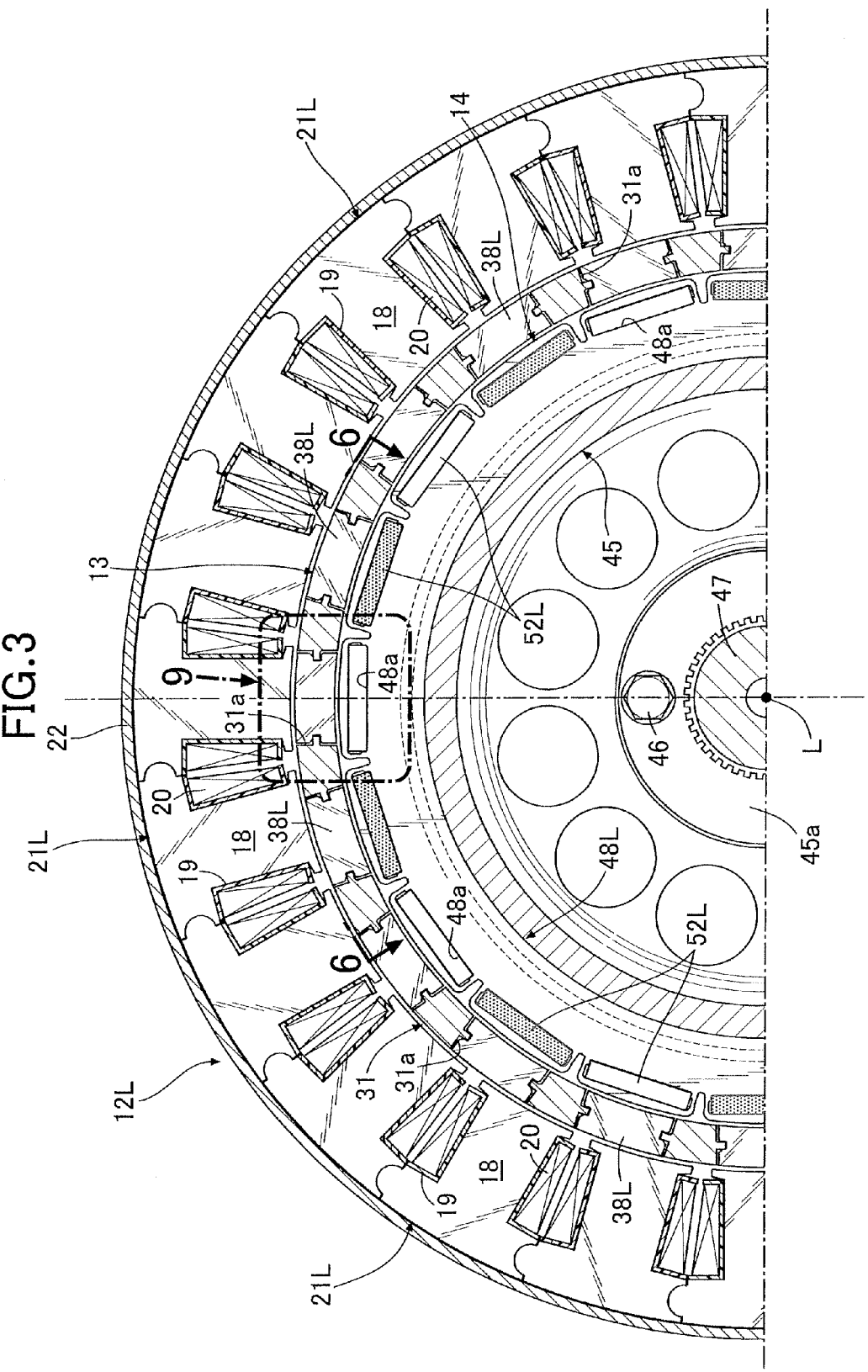
FIG. 3 is a cross-sectional view taken along line 3-3 in FIG. 2 (first embodiment).
Figure 4:
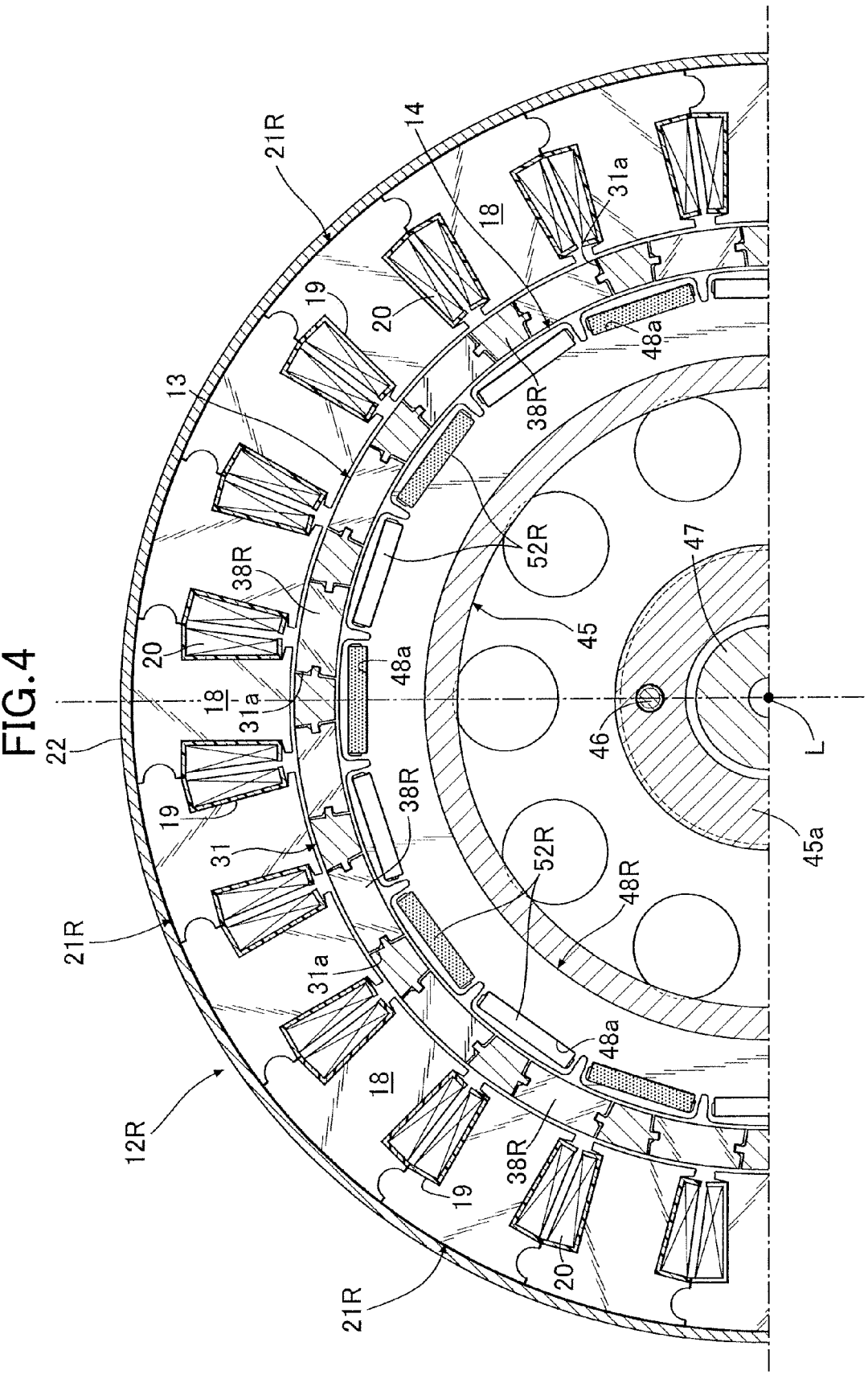
FIG. 4 is a cross-sectional view taken along line 4-4 in FIG. 2 (first embodiment).
Figure 5:
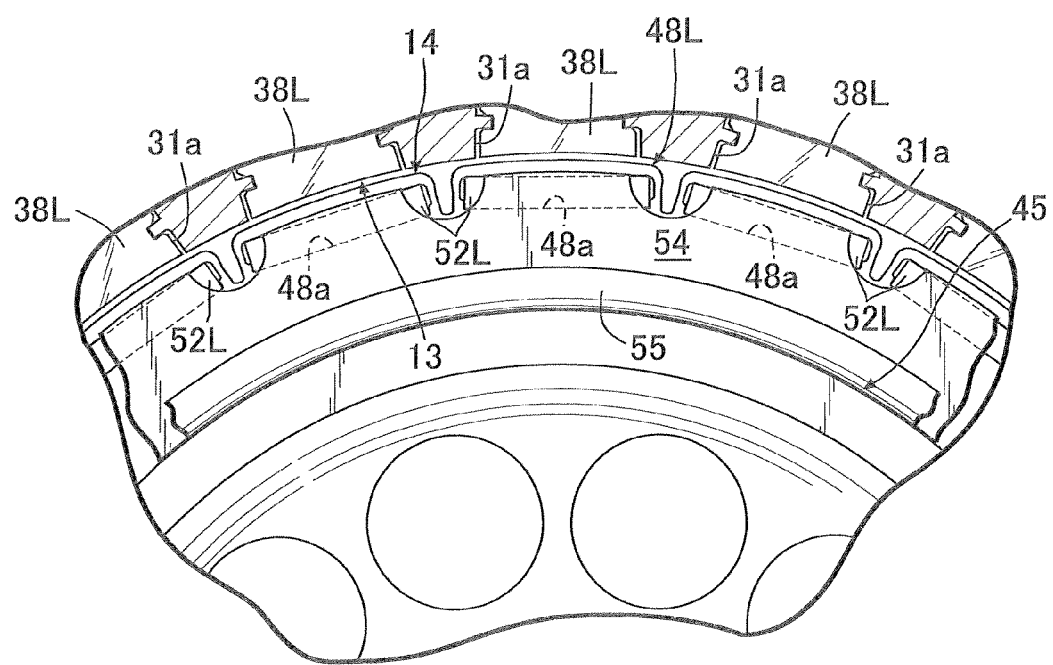
FIG. 5 is a view from arrowed line 5-5 in FIG. 2 (first embodiment).

As is clear from FIG. 1 and FIG. 2, the casing 11 is formed from a bottomed octagonal tubular main body part 15 and an octagonal plate-shaped lid part 17 fixed to an opening of the main body part 15 by a plurality of bolts 16, and a plurality of openings 15a, 17a are formed in the main body part 15 and the lid part 17 for ventilation.

As is clear from FIG. 1 to FIG. 4 and FIG. 7, the first and second stators 12L and 12R have identical structures and are superimposed in phase in the circumferential direction, the structures thereof being explained with the first stator 12L as an example. The first stator 12L includes a plurality (24 in the embodiment) of first armatures 21L formed by winding a coil 20 around the outer periphery of a core 18 made of laminated steel sheets via an insulator 19, and these first armatures 21L are made into a unit by a ring-shaped holder 22 in a state in which they are joined in the circumferential direction so as to form an overall annular shape. A flange 22a projecting radially from one end in the axis L direction of the holder 22 is fixed to a stepped portion 15b on an inner face of the main body part 15 of the casing 11 (see FIG. 2) by a plurality of bolts 23.

The second stator 12R has 24 second armatures 21R in the same way as the first stator 12L described above, and a flange 22a of a holder 22 therefor is fixed to a stepped portion 15c on the inner face of the main body part 15 of the casing 11 (see FIG. 2) by a plurality of bolts 24. In this arrangement, the phases in the circumferential direction of the first stator 12L and the second stator 12R are made to coincide with each other (see FIG. 3 and FIG. 4). Supplying three-phase alternating electric current to the first and second armatures 21L, 21R of the first and second stators 12L and 12R through three terminals 25, 26, 27 (see FIG. 1) provided on the main body part 15 of the casing 11 enables rotating magnetic fields having the same phase to be generated in the first and second stators 12L and 12R.

As is clear from FIG. 2 and FIG. 7, the outer rotor 13 is a hollow member that includes a rotor body 31 formed into a cylindrical shape from a weakly magnetic material and two rotor covers 33 and 33 formed into a disk shape from a weakly magnetic material and fixed by bolts 32 so as to cover openings at opposite ends of the rotor body 31, a first outer rotor shaft 34 projecting on the axis L from the center of one rotor cover 33 is rotatably supported on the main body part 15 of the casing 11 by a ball bearing 35, and a second outer rotor shaft 36 projecting on the axis L from the center of the other rotor cover 33 is rotatably supported on the lid part 17 of the casing 11 by a ball bearing 37. The first outer rotor shaft 34, which is an output shaft of the outer rotor 13, extends through the main body part 15 of the casing 11 and extends outward.

A weakly magnetic material is a material that is not attracted by a magnet; it includes as examples aluminum, resins, wood, etc., and might be called a non-magnetic material.

Figure 6:
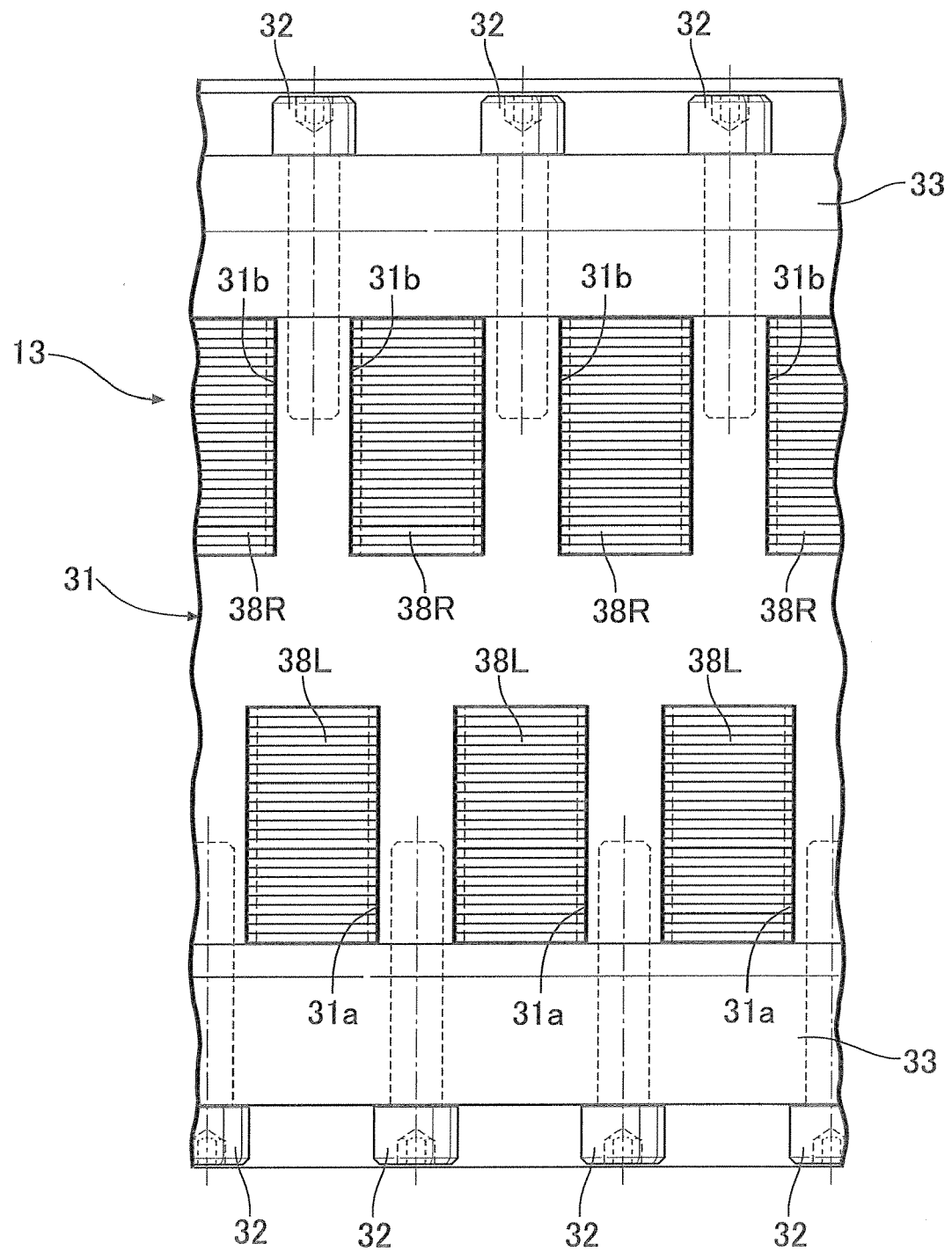
FIG. 6 is a view from arrowed line 6-6 in FIG. 3 (first embodiment).

As is clear from FIG. 2, FIG. 6, and FIG. 7, a plurality (20 in this embodiment) of slits 31a extending in parallel to the axis L are formed in one end face, in the axis L direction, of the rotor body 31 of the outer rotor 13 so as to communicate with the inside and the outside in the radial direction, and a plurality (20 in this embodiment) of slits 31b extending in parallel to the axis L are formed in the other end face, in the axis L direction, of the rotor body 31 so as to communicate with the inside and the outside in the radial direction. The slits 31a in said one end and the slits 31b in said other end are out of phase so that they are alternatingly disposed.

First induced magnetic poles 38L made of a soft magnetic material are inserted in the axis L direction into the slits 31a in said one end and embedded therein, second induced magnetic poles 38R made of a soft magnetic material are inserted in the axis L direction into the slits 31b in said other end and embedded therein, and they are retained within the slits 31a, 31b by the rotor covers 33 and 33. The first and second induced magnetic poles 38L, 38R are formed from steel sheets laminated in the axis L direction.

Since the first and second induced magnetic poles 38L, 38R are retained by being fitted into the pluralities of slits 38a, 38b provided in the rotor body 31 so as to extend in the axis L direction, assembly of the first and second induced magnetic poles 38L, 38R in the rotor body 31 becomes simple. Moreover, since the first and second induced magnetic poles 38L, 38R are engaged, in a concavo-convex manner, with the slits 31a, 31b (see FIG. 9), they do not fall out inward or outward in the radial direction of the rotor body 31.

As is clear from FIG. 2, a first resolver 42 for detecting the rotational position of the outer rotor 13 is provided so as to surround the second outer rotor shaft 36 of the outer rotor 13. The first resolver 42 is formed from a resolver rotor 43 fixed to the outer periphery of the second outer rotor shaft 36 and a resolver stator 44 fixed to the lid part 17 of the casing 11 so as to surround the periphery of the resolver rotor 43.

As is clear from FIG. 2 to FIG. 5 and FIG. 8, the inner rotor 14 includes a cylindrical-form rotor body 45, an inner rotor shaft 47 that extends through a hub 45a of the rotor body 45 and is fixed by a bolt 46, annular first and second rotor cores 48L and 48R formed from laminated steel sheets and fitted around the outer periphery of the rotor body 45, and an annular spacer 49 fitted around the outer periphery of the rotor body 45. One end of the inner rotor shaft 47 is rotatably supported in the interior of the first outer rotor shaft 34 on the axis L by a ball bearing 50, and the other end of the inner rotor shaft 47 is rotatably supported in the interior of the second outer rotor shaft 36 by a ball bearing 51, extends through the second outer rotor shaft 36 and the lid part 17 of the casing 11, and extends outward of the casing 11 as an output shaft of the inner rotor 14.

The first and second rotor cores 48L and 48R fitted around the outer periphery of the rotor body 45 have identical structures and include a plurality (20 in this embodiment) of permanent magnet support holes 48a (see FIG. 3 and FIG. 4) along outer peripheral faces thereof, and first and second permanent magnets 52L, 52R are press-fitted thereinto in the axis L direction. The polarity of adjacent first permanent magnets 52L of the first rotor core 48L alternately reverses, the polarity of adjacent second permanent magnets 52R of the second rotor core 48R alternately reverses, and the phase in the circumferential direction and the polarity of the first permanent magnets 52L of the first rotor core 48L and the phase in the circumferential direction and the polarity of the second permanent magnets 52R of the second rotor core 48R are matched with each other so that the electrical angles thereof are displaced by 180° (see FIG. 3 and FIG. 4).

The spacer 49, which is a weakly magnetic material, is fitted around the outer periphery of the rotor body 45 in the middle in the axis L direction, a pair of inside permanent magnet support plates 53 and 53 for preventing the first and second permanent magnets 52L, 52R from falling out are fitted on the outside thereof, the first and second rotor cores 48L and 48R are fitted on the outside thereof, a pair of outside permanent magnet support plates 54 and 54 for preventing the first and second permanent magnets 52L, 52R from falling out are fitted on the outside thereof, and a pair of stopper rings 55 and 55 are fixed on the outside thereof by press fitting.

As is clear from FIG. 2, a second resolver 56 for detecting the rotational position of the inner rotor 14 is provided so as to surround the inner rotor shaft 47. The second resolver 56 is formed from a resolver rotor 57 fixed to the outer periphery of the inner rotor shaft 47, and a resolver stator 58 fixed to the lid part 17 of the casing 11 so as to surround the periphery of the resolver rotor 57.

Figure 9:
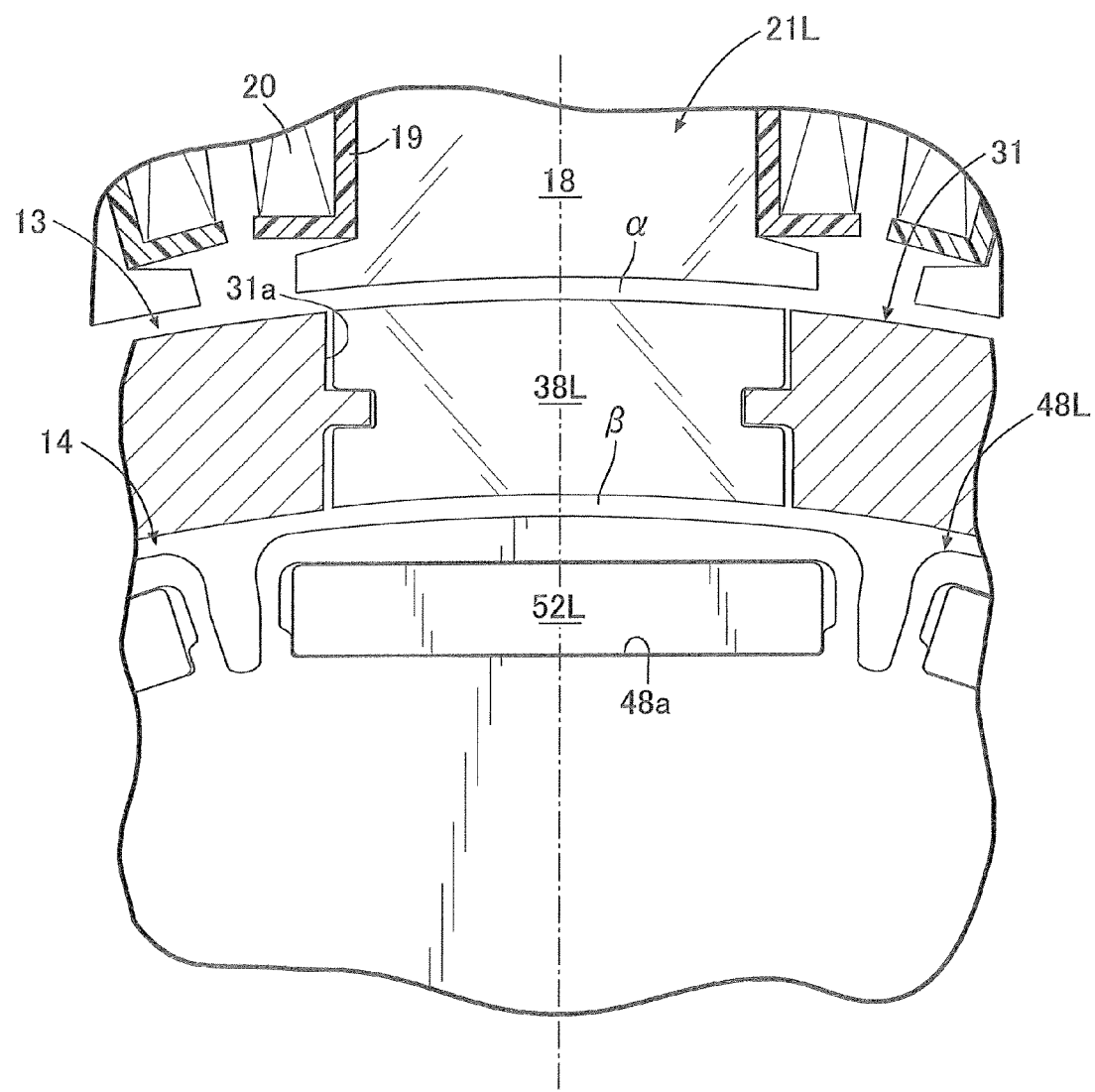
FIG. 9 is an enlarged view of part 9 in FIG. 3 (first embodiment).

As shown in an enlarged manner in FIG. 9, the inner peripheral face of the first armatures 21L of the first stator 12L faces across a slight air gap a the outer peripheral face of the first induced magnetic poles 38L exposed on the outer peripheral face of the outer rotor 13, and the outer peripheral face of the first rotor core 48L of the inner rotor 14 faces across a slight air gap 13 the inner peripheral face of the first induced magnetic poles 38L exposed on the inner peripheral face of the outer rotor 13. Similarly, the inner peripheral face of the second armatures 21R of the second stator 12R faces across a slight air gap a the outer peripheral face of the second induced magnetic poles 38R exposed on the outer peripheral face of the outer rotor 13, and the outer peripheral face of the second rotor core 48R of the inner rotor 14 faces across a slight air gap 13 the inner peripheral face of the second induced magnetic poles 38R exposed on the inner peripheral face of the outer rotor 13.

Next, the operating principle of the electric motor M of the first embodiment having the above-mentioned arrangement is explained.

Figure 10:
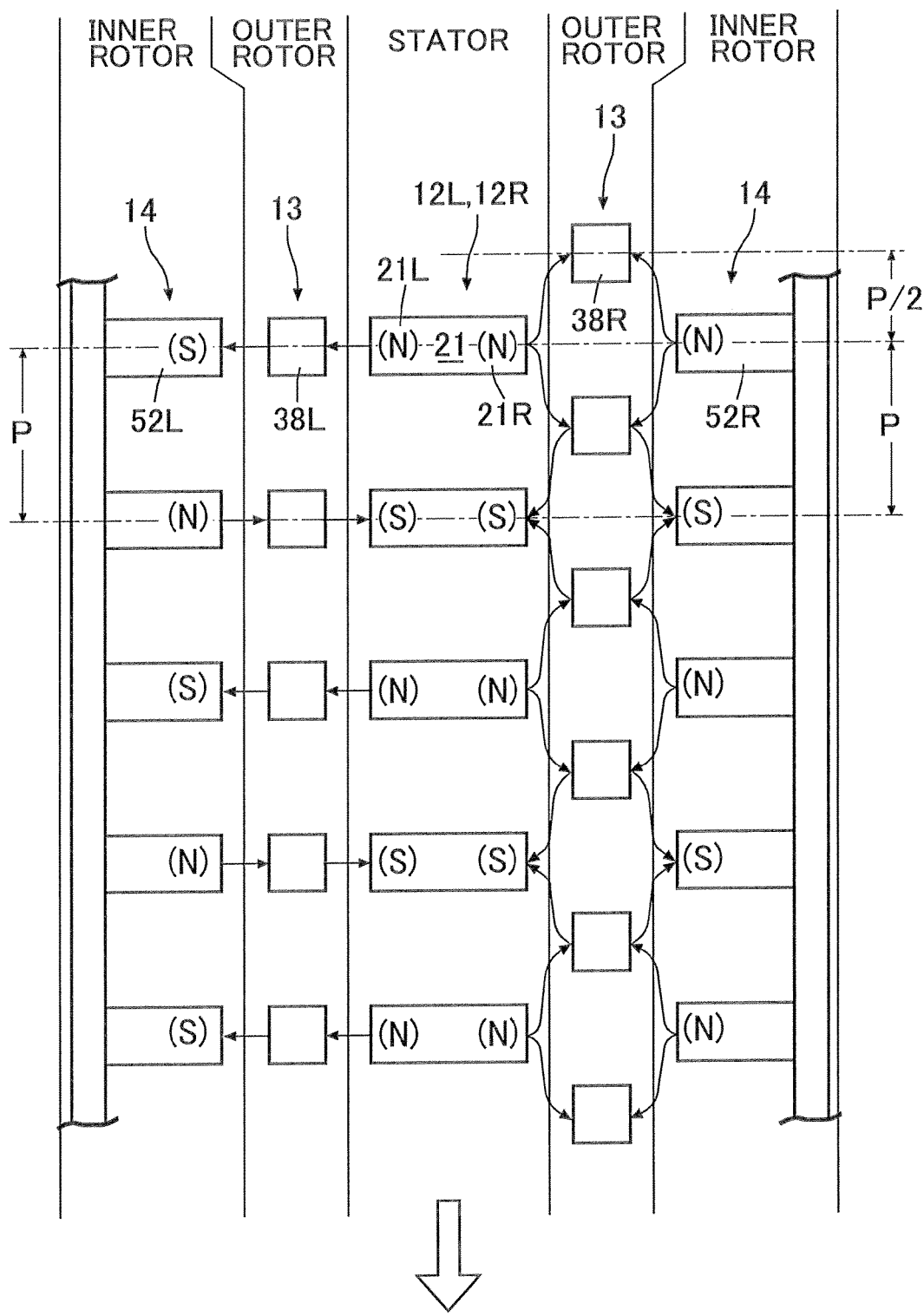
FIG. 10 is a schematic diagram in which the electric motor is spread out in the circumferential direction (first embodiment).

FIG. 10 schematically shows a state in which the electric motor M is spread out in the circumferential direction. The first and second permanent magnets 52L, 52R of the inner rotor 14 are shown on left and right sides of FIG. 10 respectively. The first and second permanent magnets 52L, 52R are disposed so that N poles and S poles are alternatingly arranged at a predetermined pitch P in the circumferential direction (vertical direction in FIG. 10) and the polarity of the first permanent magnets 52L and the polarity of the second permanent magnets 52R, which are mutually opposing in the axis L direction (left-and-right direction in FIG. 10), are opposite to each other.

Virtual permanent magnets 21 corresponding to the first and second armatures 21L, 21R of the first and second stators 12L and 12R are disposed in a central part of FIG. 10 at the predetermined pitch P in the circumferential direction. In practice, since the number of first and second armatures 21L, 21R of the first and second stators 12L and 12R is 24 each, and the number of first and second permanent magnets 52L, 52R of the inner rotor 14 is 20 each, the pitch of the first and second armatures 21L, 21R does not coincide with the pitch P of the first and second permanent magnets 52L, 52R of the inner rotor 14.

However, since the first and second armatures 21L, 21R each form a rotating magnetic field, these first and second armatures 21L, 21R can be replaced by 20 virtual permanent magnets 21 disposed at the pitch P and rotating in the circumferential direction. Hereinafter, the first and second armatures 21L, 21R are called first and second virtual magnetic poles 21L, 21R of the virtual permanent magnets 21. The polarity of the first and second virtual magnetic poles 21L, 21R of the virtual permanent magnets 21 adjacent in the circumferential direction is alternatingly reversed, and the first virtual magnetic poles 21L and the second virtual magnetic poles 21R of the virtual permanent magnets 21 have the same polarity and are aligned in the axial direction L.

The first and second induced magnetic poles 38L, 38R of the outer rotor 13 are disposed between the first and second permanent magnets 52L, 52R and the virtual permanent magnets 21. The first and second induced magnetic poles 38L, 38R are disposed at the pitch P in the circumferential direction, and the first induced magnetic poles 38L and the second induced magnetic poles 38R are displaced by only half of the pitch P in the circumferential direction.

As shown in FIG. 10, when the polarity of the first virtual magnetic pole 21L of the virtual permanent magnet 21 is different from the polarity of the (closest) first permanent magnet 52L opposite thereto, the polarity of the second virtual magnetic pole 21R of the virtual permanent magnet 21 is the same as the polarity of the (closest) second permanent magnet 52R opposite thereto. Furthermore, when the polarity of the second virtual magnetic pole 21R of the virtual permanent magnet 21 is different from the polarity of the (closest) second permanent magnet 52R opposite thereto, the polarity of the first virtual magnetic pole 21L of the virtual permanent magnet 21 is the same as the polarity of the (closest) first permanent magnet 52L opposite thereto (see FIG. 12 (G)).

First, the operation when the outer rotor 13 (first and second induced magnetic poles 38L, 38R) is rotatably driven by generating a rotating magnetic field in the first and second stators 12L and 12R (first and second virtual magnetic poles 21L, 21R) in a state in which the inner rotor 14 (first and second permanent magnets 52L, 52R) is non-rotatably fixed is explained. In this case, the virtual permanent magnets 21 rotate downward in the drawings relative to the fixed first and second permanent magnets 52L, 52R in the sequence FIG. 11 (A)→FIG. 11 (B)→FIG. 11 (C)→FIG. 11 (D)→FIG. 12 (E)→FIG. 12 (F)→FIG. 12 (G), and the first and second induced magnetic poles 38L, 38R thereby rotate downward in the drawings.

As shown in FIG. 11 (A), from a state in which the first induced magnetic poles 38L are aligned relative to the mutually opposing first permanent magnets 52L and first virtual magnetic poles 21L of the virtual permanent magnets 21, and the second induced magnetic poles 38R are displaced by a half pitch P/2 relative to the mutually opposing second virtual magnetic poles 21R and second permanent magnets 52R, the virtual permanent magnets 21 are rotated downward in the drawing. At the time when rotation starts, the polarities of the first virtual magnetic poles 21L of the virtual permanent magnets 21 are different from the polarities of the first permanent magnets 52L opposite thereto, and the polarities of the second virtual magnetic poles 21R of the virtual permanent magnets 21 are the same as the polarities of the second permanent magnets 52R opposite thereto.

Since the first induced magnetic poles 38L are disposed between the first permanent magnets 52L and the first virtual magnetic poles 21L of the virtual permanent magnets 21, the first induced magnetic poles 38L are magnetized by the first permanent magnets 52L and the first virtual magnetic poles 21L, and first lines of magnetic force G1 are generated between the first permanent magnets 52L, the first induced magnetic poles 38L, and the first virtual magnetic poles 21L. Similarly, since the second induced magnetic poles 38R are disposed between the second virtual magnetic poles 21R and the second permanent magnets 52R, the second induced magnetic poles 38R are magnetized by the second virtual magnetic poles 21R and the second permanent magnets 52R, and second lines of magnetic force G2 are generated between the second virtual magnetic poles 21R, the second induced magnetic poles 38R, and the second permanent magnets 52R.

In the state shown in FIG. 11 (A), the first lines of magnetic force G1 are generated so as to connect the first permanent magnets 52L, the first induced magnetic poles 38L, and the first virtual magnetic poles 21L, and the second lines of magnetic force G2 are generated so as to connect two second virtual magnetic poles 21R adjacent to each other in the circumferential direction and a second induced magnetic pole 38R positioned between the two and so as to connect two second permanent magnets 52R adjacent to each other in the circumferential direction and a second induced magnetic pole 38R positioned between the two. As a result, in this state, a magnetic circuit as shown in FIG. 13 (A) is formed. In this state, since the first lines of magnetic force G1 are linear, there is no magnetic force acting on the first induced magnetic poles 38L so as to rotate them in the circumferential direction. Furthermore, the two second lines of magnetic forces G2 between the two second virtual magnetic poles 21R adjacent to each other in the circumferential direction and the second induced magnetic pole 38R have a mutually equal degree of curvature and a mutually equal total amount of magnetic flux, and similarly the two second lines of magnetic force G2 between the two second permanent magnets 52R adjacent to each other in the circumferential direction and the second induced magnetic poles 38R have a mutually equal degree of curvature and a mutually equal total amount of magnetic flux, thus achieving a balance. Because of this, there is no magnetic force acting on the second induced magnetic poles 38R so as to rotate them in the circumferential direction.

When the virtual permanent magnets 21 rotate from the position shown in FIG. 11 (A) to the position shown in FIG. 11 (B), the second lines of magnetic force G2 are generated so as to connect the second virtual magnetic poles 21R, the second induced magnetic poles 38R, and the second permanent magnets 52R, and the first lines of magnetic force G1 between the first induced magnetic poles 38L and the first virtual magnetic poles 21L are in a curved state. Accompanying this, a magnetic circuit as shown in FIG. 13 (B) is formed by the first and second lines of magnetic force G1, G2.

In this state, although the degree of curvature of the first lines of magnetic force G1 is small, since the total amount of magnetic flux thereof is large, a relatively strong magnetic force acts on the first induced magnetic poles 38L. Because of this, the first induced magnetic poles 38L are driven by a relatively large driving force in the direction of rotation of the virtual permanent magnets 21, that is, in the direction of rotation of the magnetic field, and as a result the outer rotor 13 rotates in the direction of rotation of the magnetic field. Furthermore, although the degree of curvature of the second lines of magnetic force G2 is large, since the total amount of magnetic flux thereof is small, a relatively weak magnetic force acts on the second induced magnetic poles 38R; because of this the second induced magnetic poles 38R are driven by a relatively small driving force in the direction of rotation of the magnetic field, and as a result the outer rotor 13 rotates in the direction of rotation of the magnetic field.

Subsequently, when the virtual permanent magnets 21 rotate in sequence from the position shown by FIG. 11 (B) to positions shown by FIGS. 11 (C) and (D) and FIGS. 12 (E) and (F), the first induced magnetic poles 38L and the second induced magnetic poles 38R are driven in the direction of rotation of the magnetic field by virtue of a magnetic force caused by the first and second lines of magnetic force G1, G2, and as a result the outer rotor 13 rotates in the direction of rotation of the magnetic field. During this, the magnetic force acting on the first induced magnetic poles 38L gradually weakens since the total amount of magnetic flux of the first lines of magnetic force G1 decreases although the degree of curvature thereof increases, and the driving force to drive the first induced magnetic poles 38L in the direction of rotation of the magnetic field gradually decreases. Furthermore, the magnetic force acting on the second induced magnetic poles 38R gradually increases since the total amount of magnetic flux of the second lines of magnetic force G2 increases although the degree of curvature thereof decreases, and the driving force to drive the second induced magnetic poles 38R in the direction of rotation of the magnetic field gradually increases.

While the virtual permanent magnet 21 rotates from the position shown in FIG. 12 (E) to the position shown in FIG. 12 (F), the second lines of magnetic force G2 attain a curved state and the total amount of magnetic flux thereof attains almost its maximum state; as a result the strongest magnetic force acts on the second induced magnetic poles 38R, and the driving force acting on the second induced magnetic poles 38R becomes a maximum. Subsequently, as shown in FIG. 12 (G), when the virtual permanent magnet 21 rotates from the original position of FIG. 11 (A) by a portion corresponding to the pitch P and the first and second virtual magnetic poles 21L, 21R of the virtual permanent magnet 21 thereby rotate to positions facing the first and second permanent magnets 52L, 52R respectively, a state occurs in which left and right are inverted from the state of FIG. 11 (A), and only at that moment does a magnetic force to rotate the outer rotor 13 in the circumferential direction not act thereon.

When the virtual permanent magnet 21 further rotates from this state, the first and second induced magnetic poles 38L, 38R are driven in the direction of rotation of the magnetic field by virtue of a magnetic force due to the first and second lines of magnetic force G1, G2, and the outer rotor 13 rotates in the direction of rotation of the magnetic field. In this process, while the virtual permanent magnet 21 rotates until it is again in the position shown in FIG. 11 (A), conversely to the above, the magnetic force acting on the first induced magnetic poles 38L increases since the total amount of magnetic flux of the first lines of magnetic force G1 increases although the degree of curvature thereof decreases, and the driving force acting on the first induced magnetic poles 38L increases. On the other hand, the magnetic force acting on the second induced magnetic poles 38R decreases since the total amount of magnetic flux of the second lines of magnetic force G2 decreases although the degree of curvature thereof increases, and the driving force acting on the second induced magnetic poles 38R decreases.

Moreover, as is clear from comparing FIG. 11 (A) and FIG. 12 (G), since the first and second induced magnetic poles 38L, 38R rotate by only half of the pitch P/2 accompanying rotation of the virtual permanent magnet 21 by a portion corresponding to the pitch P, the outer rotor 13 rotates at a speed that is ½ of a rotational speed of the rotating magnetic field of the first and second stators 12L and 12R. This is because, by virtue of the magnetic force due to the first and second lines of magnetic forces G1, G2, the first and second induced magnetic poles 38L, 38R rotate while maintaining a state in which they are positioned midway between the first permanent magnets 52L and the first virtual magnetic poles 21L connected by the first lines of magnetic force G1 and midway between the second permanent magnets 52R and the second virtual magnetic poles 21R connected by the second lines of magnetic force G2 respectively.

Next, the operation of the electric motor M when the inner rotor 14 is rotated in a state in which the outer rotor 13 is fixed is explained by reference to FIG. 14 and FIG. 15.

First, as shown in FIG. 14 (A), the first and second rotating magnetic fields are rotated downward in the drawing from a state in which each of the first induced magnetic poles 38L faces the respective first permanent magnet 52L and each of the second induced magnetic poles 38R is positioned between two adjacent second permanent magnets 52R. At the time when rotation starts, the polarity of each of the first virtual magnetic poles 21L is made different from the polarity of each of the first permanent magnets 52L opposite thereto, and the polarity of each of the second virtual magnetic poles 21R is made the same as the polarity of each of the second permanent magnets 52R opposite thereto.

When the virtual permanent magnets 21 rotate from this state to the position shown in FIG. 14 (B), the first lines of magnetic force G1 between the first induced magnetic poles 38L and the first virtual magnetic poles 21L attain a curved state, and the second virtual magnetic poles 21R move closer to the second induced magnetic poles 38R, thereby generating second lines of magnetic force G2 that connect the second virtual magnetic poles 21R, the second induced magnetic poles 38R, and the second permanent magnets 52R. As a result, magnetic circuits as shown in FIG. 13 (B) above are formed in the first and second permanent magnets 52L, 52R, the virtual permanent magnets 21, and the first and second induced magnetic poles 38L, 38R.

In this state, although the total amount of magnetic flux of the first lines of magnetic force G1 between the first permanent magnets 52L and the first induced magnetic poles 38L is high, since the first lines of magnetic force G1 are straight, a magnetic force that rotates the first permanent magnets 52L relative to the first induced magnetic poles 38L is not generated. Furthermore, since the distance between the second permanent magnets 52R and the second virtual magnetic poles 21R, which have different polarities therefrom, is relatively long, although the total amount of magnetic flux of the second lines of magnetic force G2 between the second induced magnetic poles 38R and the second permanent magnets 52R is relatively small, the degree of curvature thereof is large, and a magnetic force therefore acts on the second permanent magnets 52R so as to move them closer to the second induced magnetic poles 38R. Because of this, the second permanent magnets 52R are driven together with the first permanent magnets 52L in a direction opposite to the direction of rotation of the virtual permanent magnets 21, that is, the direction of rotation of the magnetic field (upward in FIG. 14), and rotate toward the position shown in FIG. 14 (C). Furthermore, accompanying this, the inner rotor 14 rotates in a direction opposite to the direction of rotation of the magnetic field.

While the first and second permanent magnets 52L, 52R rotate from the position shown in FIG. 14 (B) toward the position shown in FIG. 14 (C), the virtual permanent magnets 21 rotate toward the position shown in FIG. 14 (D). As hereinbefore described, due to the second permanent magnets 52R moving closer to the second induced magnetic poles 38R, although the degree of curvature of the second lines of magnetic force G2 between the second induced magnetic poles 38R and the second permanent magnets 52R decreases, the total amount of magnetic flux of the second lines of magnetic force G2 increases accompanying the virtual permanent magnets 21 moving closer to the second induced magnetic poles 38R. As a result, in this case also, a magnetic force acts on the second permanent magnets 52R so as to bring them closer toward the second induced magnetic poles 38R side, and the second permanent magnets 52R are thereby driven together with the first permanent magnets 52L in a direction opposite to the direction of rotation of the magnetic field.

Moreover, accompanying rotation of the first permanent magnets 52L in the direction opposite to the direction of rotation of the magnetic field, the first lines of magnetic force G1 between the first permanent magnets 52L and the first induced magnetic poles 38L is curved, and a magnetic force therefore acts on the first permanent magnets 52L so as to bring them closer to the first induced magnetic poles 38L. However, in this state, the magnetic force due to the first lines of magnetic force G1 is weaker than the above-mentioned magnetic force due to the second lines of magnetic force G2 since the degree of curvature of the first lines of magnetic force G1 is smaller than that of the second lines of magnetic force G2. As a result, the second permanent magnets 52R are driven together with the first permanent magnets 52L in a direction opposite to the direction of rotation of the magnetic field by means of a magnetic force corresponding to the difference between the two magnetic forces.

As shown in FIG. 14 (D), when the distance between the first permanent magnets 52L and the first induced magnetic poles 38L becomes substantially equal to the distance between the second induced magnetic poles 38R and the second permanent magnets 52R, the total amount of magnetic flux and the degree of curvature of the first lines of magnetic force G1 between the first permanent magnets 52L and the first induced magnetic poles 38L become substantially equal to the total amount of magnetic flux and the degree of curvature of the second lines of magnetic force G2 between the second induced magnetic poles 38R and the second permanent magnets 52R.

As a result, magnetic forces due to these first and second lines of magnetic forces G1, G2 substantially balance each other, thus giving a state in which the first and second permanent magnets 52L, 52R are temporarily not driven.

When the virtual permanent magnets 21 rotate from this state to the position shown in FIG. 15 (E), the state in which the first lines of magnetic force G1 are generated changes, and the magnetic circuit shown in FIG. 15 (F) is formed. Because of this, since the magnetic force due to the first lines of magnetic force G1 hardly acts on the first permanent magnets 52L so as to bring them closer to the first induced magnetic poles 38L, the second permanent magnets 52R are driven together with the first permanent magnets 52L up to the position shown in FIG. 15 (G) in a direction opposite to the direction of rotation of the magnetic field by virtue of a magnetic force due to the second lines of magnetic force G2.

When the virtual permanent magnets 21 rotate slightly from the position shown in FIG. 15 (G), in contrast to the above, a magnetic force due to the first lines of magnetic force G1 between the first permanent magnets 52L and the first induced magnetic poles 38L acts on the first permanent magnets 52L so as to bring them closer to the first induced magnetic poles 38L, the first permanent magnets 52L are thereby driven together with the second permanent magnets 52R in a direction opposite to the direction of rotation of the magnetic field, and the inner rotor 14 rotates in a direction opposite to the direction of rotation of the magnetic field. When the virtual permanent magnets 21 further rotate, the first permanent magnets 52L are driven together with the second permanent magnets 52R in a direction opposite to the direction of rotation of the magnetic field by virtue of a magnetic force corresponding to the difference between a magnetic force due to the first lines of magnetic force G1 between the first permanent magnets 52L and the first induced magnetic poles 38L and a magnetic force due to the second lines of magnetic force G2 between the second induced magnetic poles 38R and the second permanent magnets 52R. Subsequently, the magnetic force due to the second lines of magnetic force G2 hardly acts on the second permanent magnets 52R so as to bring them closer to the second induced magnetic poles 38R, and the first permanent magnets 52L are driven together with the second permanent magnets 52R by virtue of the magnetic force due to the first lines of magnetic force G1.

As hereinbefore described, accompanying rotation of the first and second rotating magnetic fields, the magnetic force due to the first lines of magnetic force G1 between the first permanent magnets 52L and the first induced magnetic poles 38L, the magnetic force due to the second lines of magnetic force G2 between the second induced magnetic poles 38R and the second permanent magnets 52R, and the magnetic force corresponding to the difference between these magnetic forces act in turn on the first and second permanent magnets 52L, 52R, that is, the inner rotor 14, and the inner rotor 14 thereby rotates in a direction opposite to the direction of rotation of the magnetic field. Furthermore, the magnetic force, that is, the driving force, acts in turn on the inner rotor 14 in this way, thus making the torque of the inner rotor 14 substantially constant.

In this case, the inner rotor 14 rotates in reverse at the same speed as that of the first and second rotating magnetic fields. This is because the first and second permanent magnets 52L, 52R rotate while maintaining a state in which the first and second induced magnetic poles 38L, 38R are positioned midway between the first permanent magnets 52L and the first virtual magnetic poles 21L and midway between the second permanent magnets 52R and the second virtual magnetic poles 21R respectively by virtue of the magnetic forces due to the first and second lines of magnetic forces G1, G2.

A case in which the inner rotor 14 is fixed and the outer rotor 13 is rotated in the direction of rotation of the magnetic field and a case in which the outer rotor 13 is fixed and the inner rotor 14 is rotated in a direction opposite to the direction of rotation of the magnetic field are individually explained above, but it is of course possible to rotate both the inner rotor 14 and the outer rotor 13 in directions opposite to each other.

As hereinbefore described, when either one of the inner rotor 14 and the outer rotor 13 is rotated or both of the inner rotor 14 and the outer rotor 13 are rotated, the state of magnetization of the first and second induced magnetic poles 38L, 38R changes according to the relative rotational positions of the inner rotor 14 and the outer rotor 13, rotation can be carried out without causing slippage, and since the function is that of a synchronous machine, the efficiency can be enhanced. Furthermore, since the numbers of first virtual magnetic poles 21L, first permanent magnets 52L, and first induced magnetic poles 38L are set so as to be identical to each other, and the number of second virtual magnetic poles 21R, second permanent magnets 52R, and second induced magnetic poles 38R are set so as to be identical to each other, a sufficient torque of the electric motor M can be obtained when either the inner rotor 14 or the outer rotor 13 is driven.

As hereinbefore described, in accordance with the present embodiment, by displacing the phases of the polarity of the first and second rotating magnetic fields of the first and second stators 12L and 12R from each other by only the pitch P and displacing the phases of the first and second induced magnetic poles 38L, 38R of the outer rotor 13 from each other by only half of the pitch P, the phases of the magnetic poles of the first and second permanent magnets 52L, 52R of the inner rotor 14 can be made to coincide with each other, thus enabling the first and second permanent magnets 52L, 52R to be supported on the inner rotor 14 easily and the structure of the inner rotor 14 to be simplified.

Second Embodiment

Figure 16:
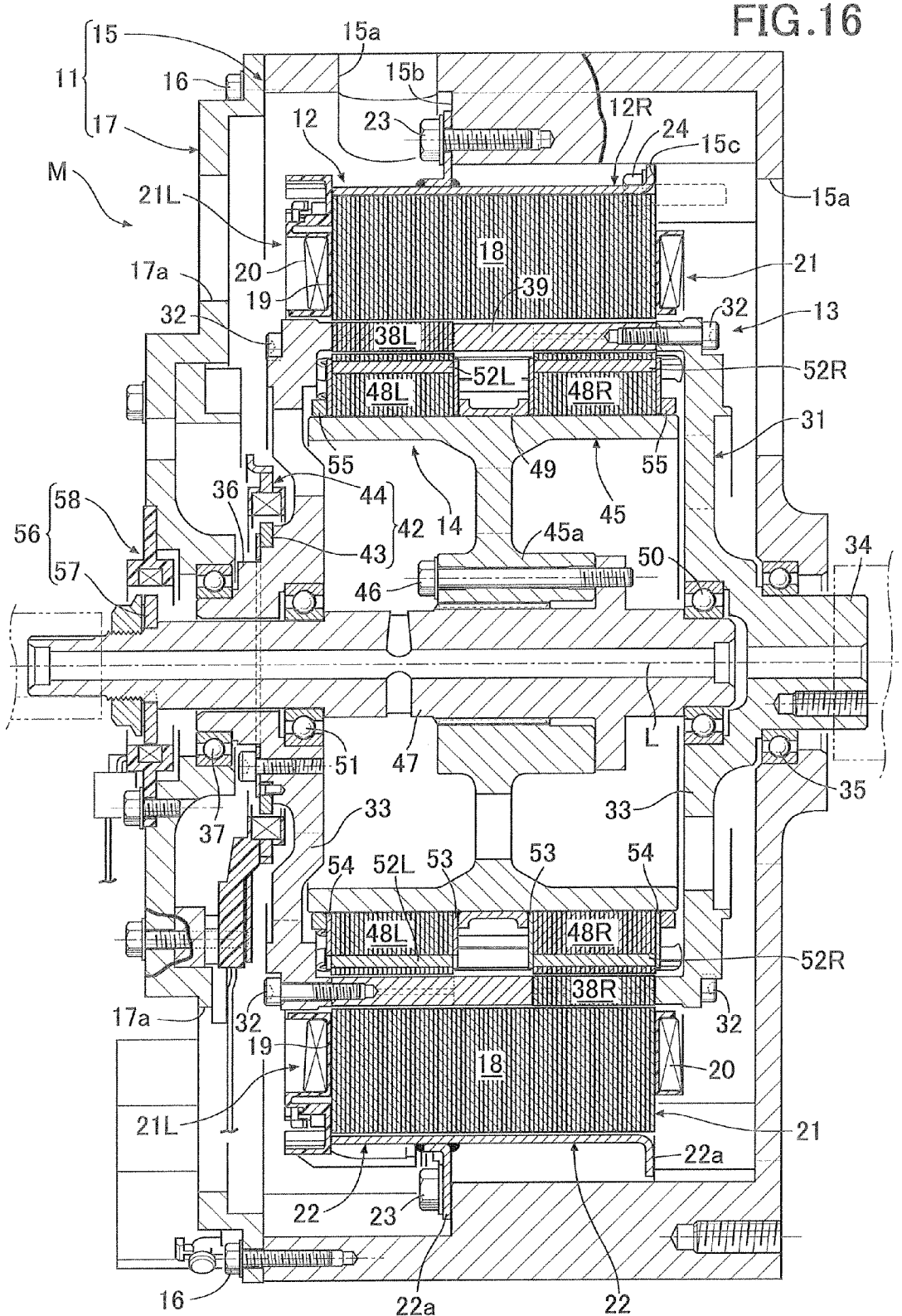
FIG. 16 is a view corresponding to FIG. 2 above (second embodiment).
Figure 18:
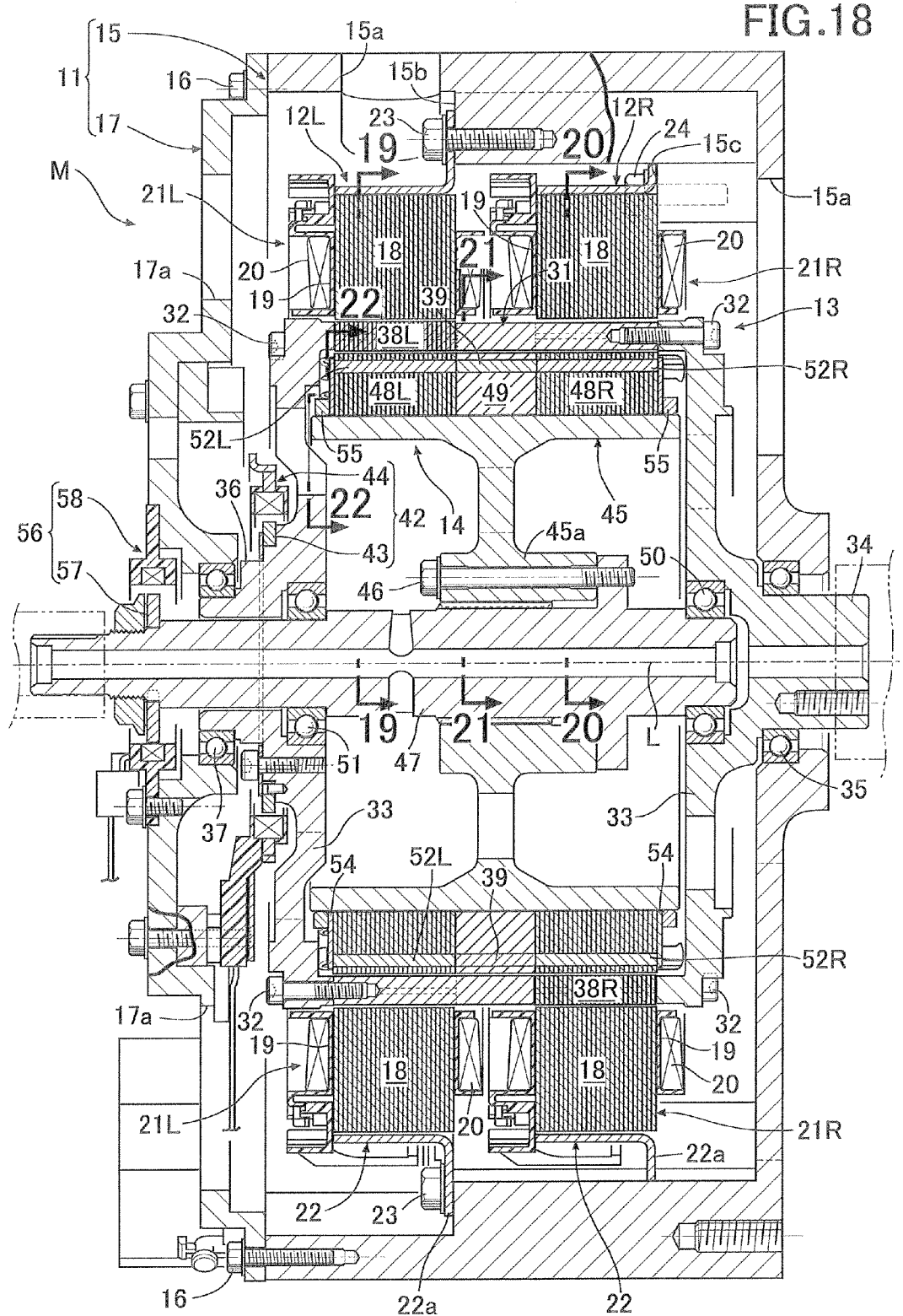
FIG. 18 is a view corresponding to FIG. 2 above (fourth embodiment).
Figure 19:
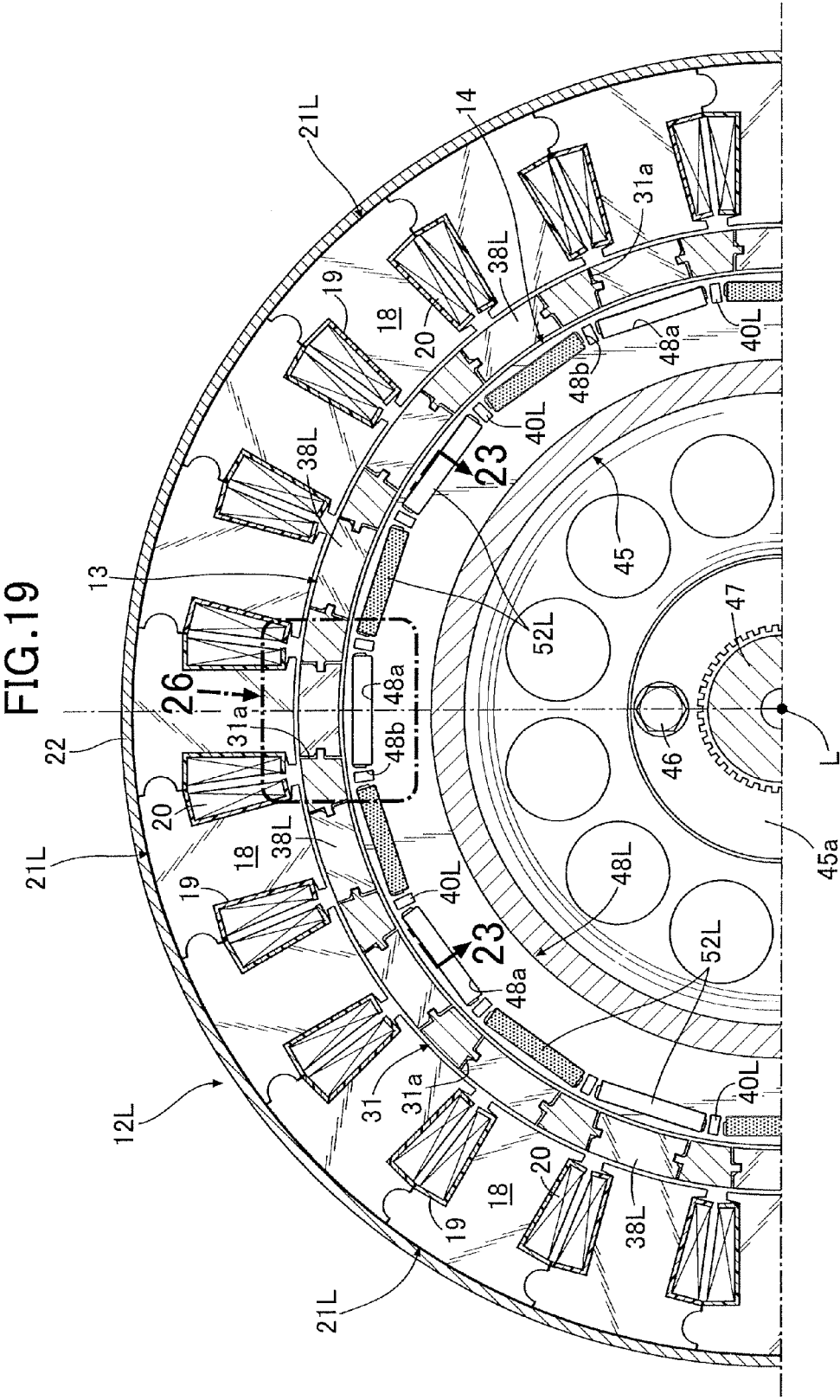
FIG. 19 is a cross-sectional view taken along line 19-19 in FIG. 18 (fourth embodiment).
Figure 20:
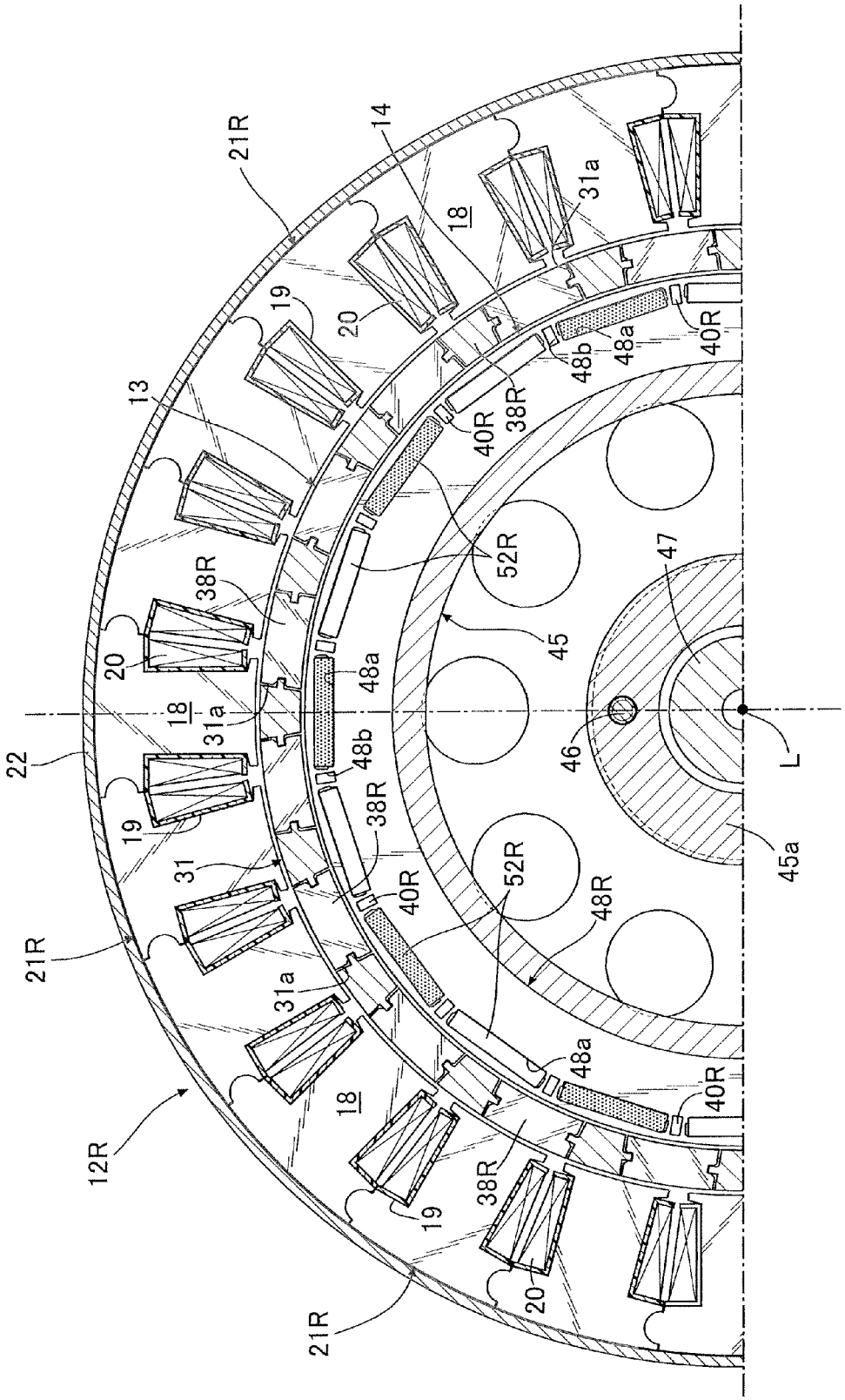
FIG. 20 is a cross-sectional view taken along line 20-20 in FIG. 18 (fourth embodiment).
Figure 21:
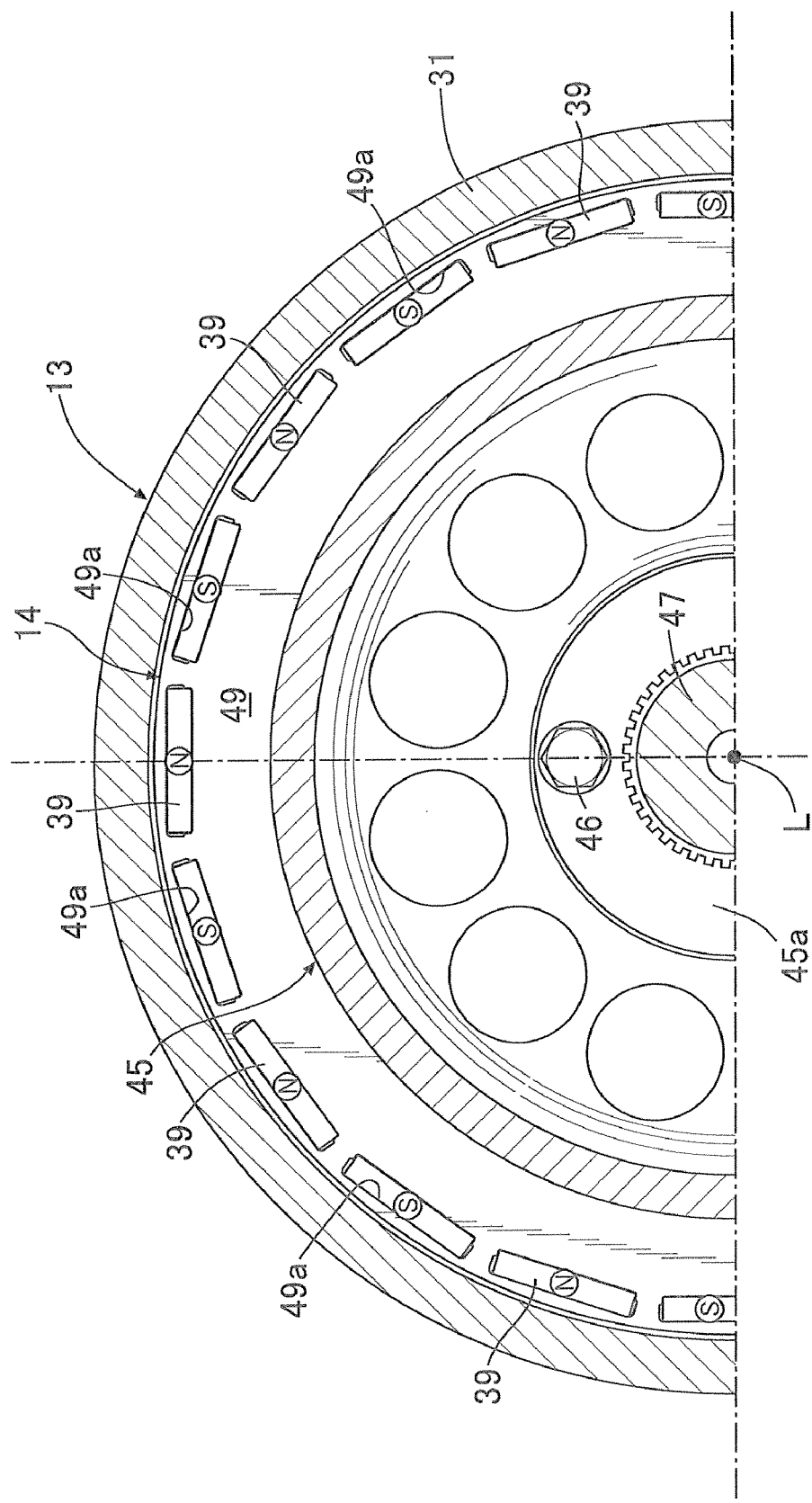
FIG. 21 is a view from arrowed line 21-21 in FIG. 18 (fourth embodiment).
Figure 22:
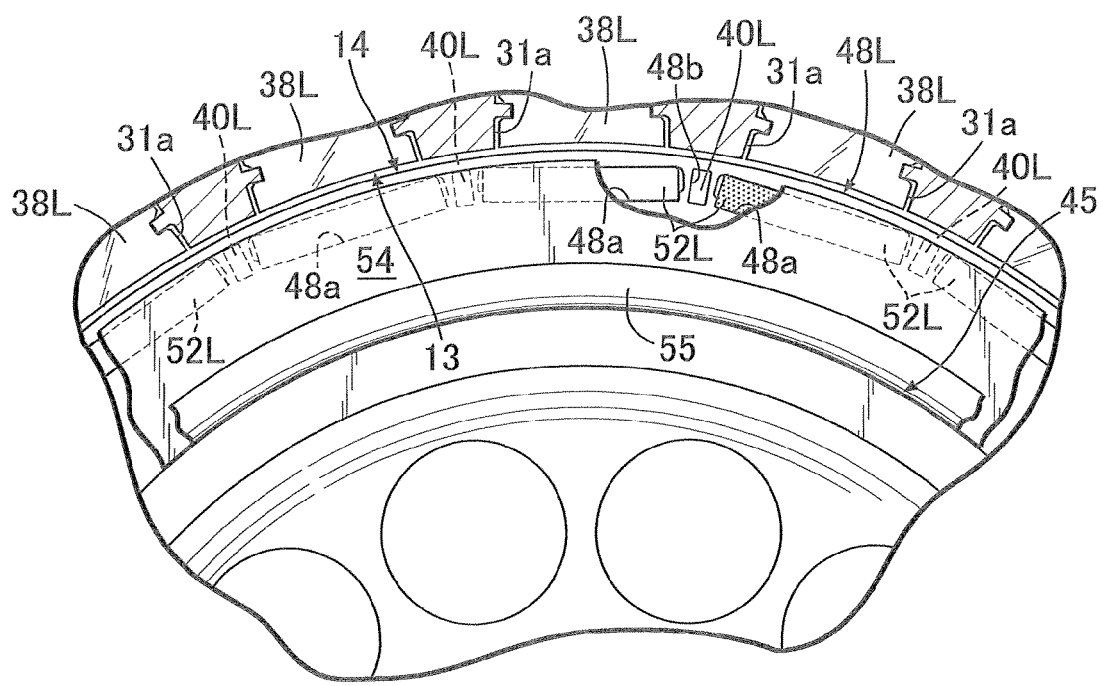
FIG. 22 is a view from arrowed line 22-22 in FIG. 18 (fourth embodiment).
Figure 23:
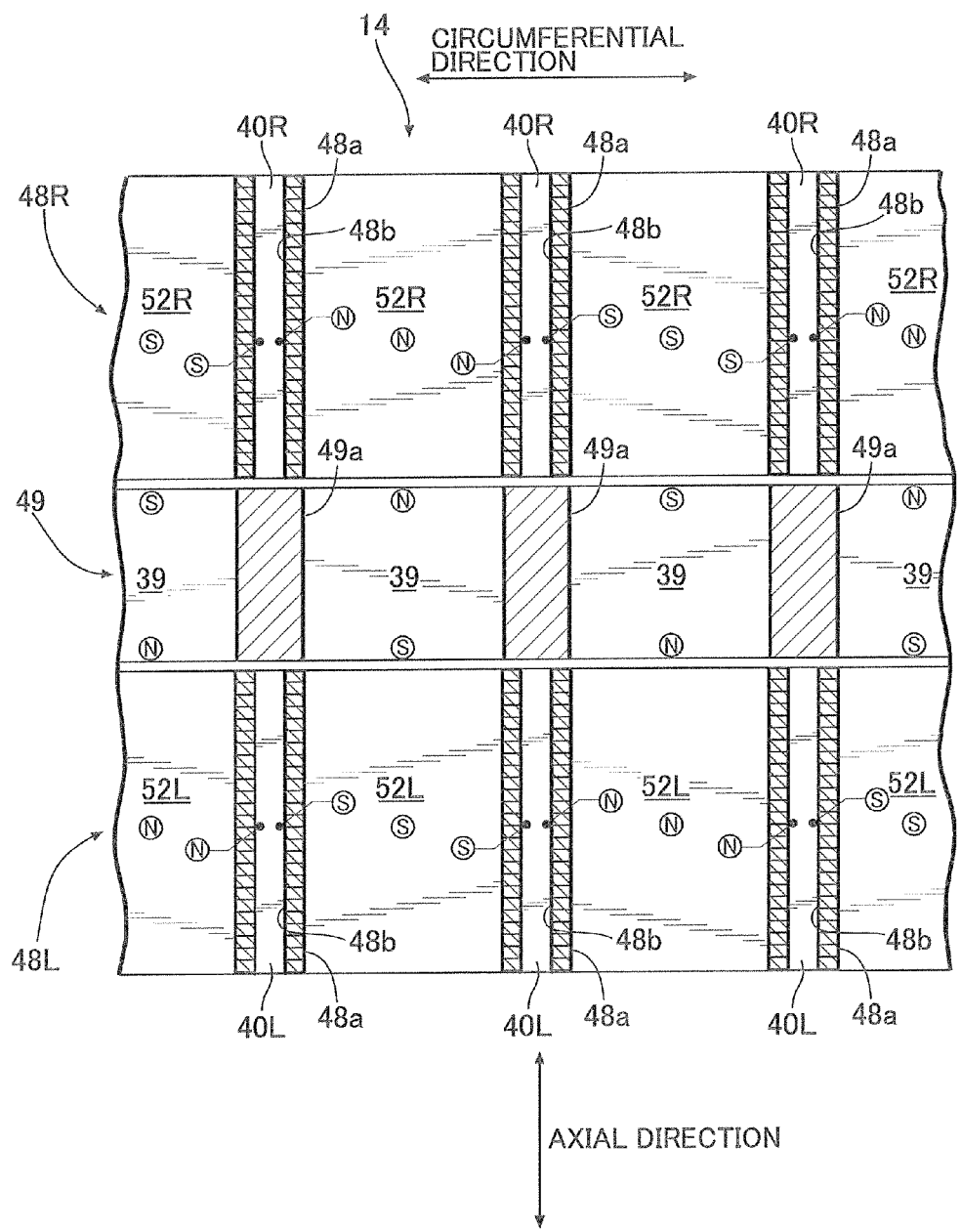
FIG. 23 is a cross-sectional view taken along line 23-23 in FIG. 19 (fourth embodiment).
Figure 24:
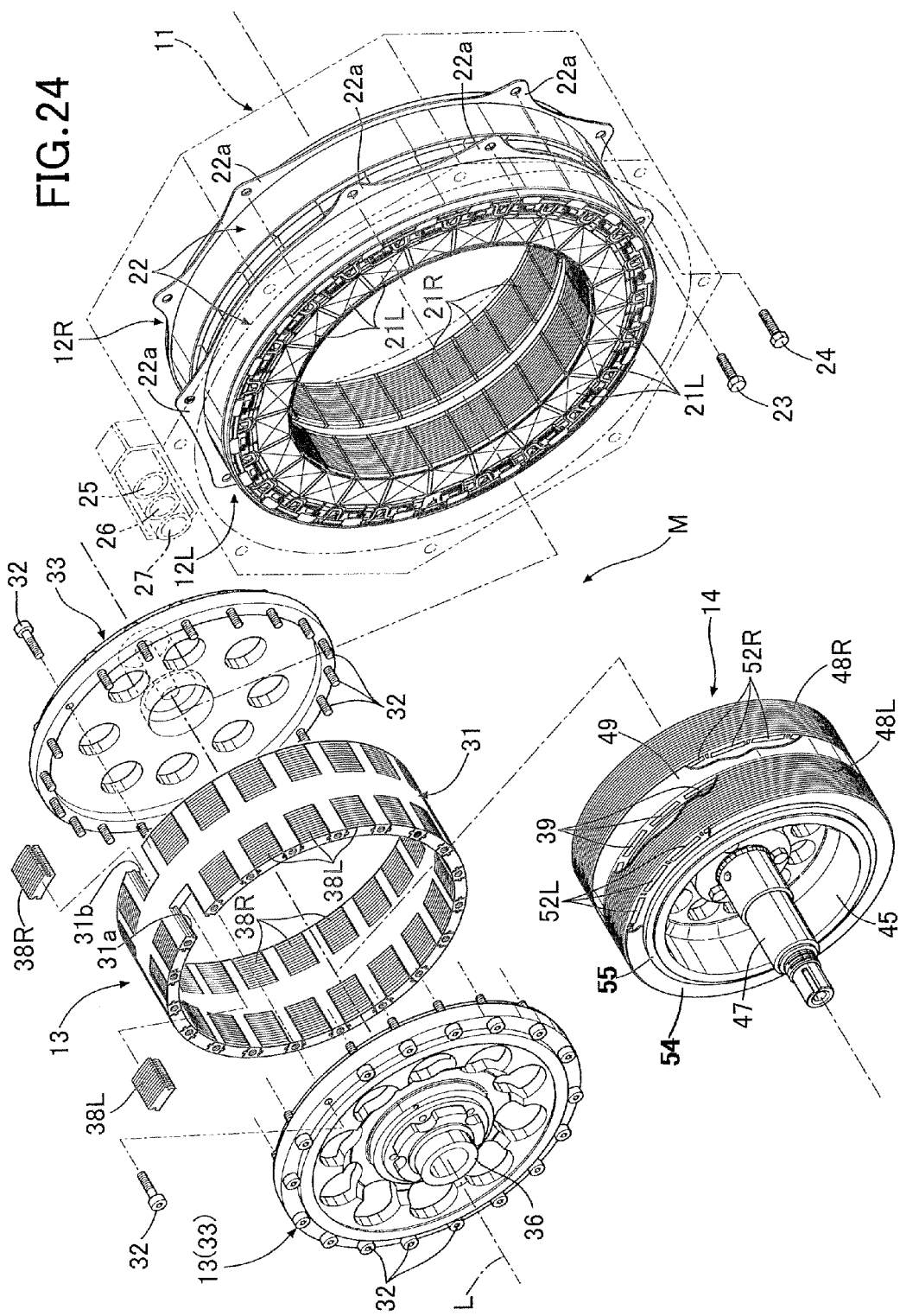
FIG. 24 is an exploded perspective view of an electric motor (fourth embodiment).
Figure 25:
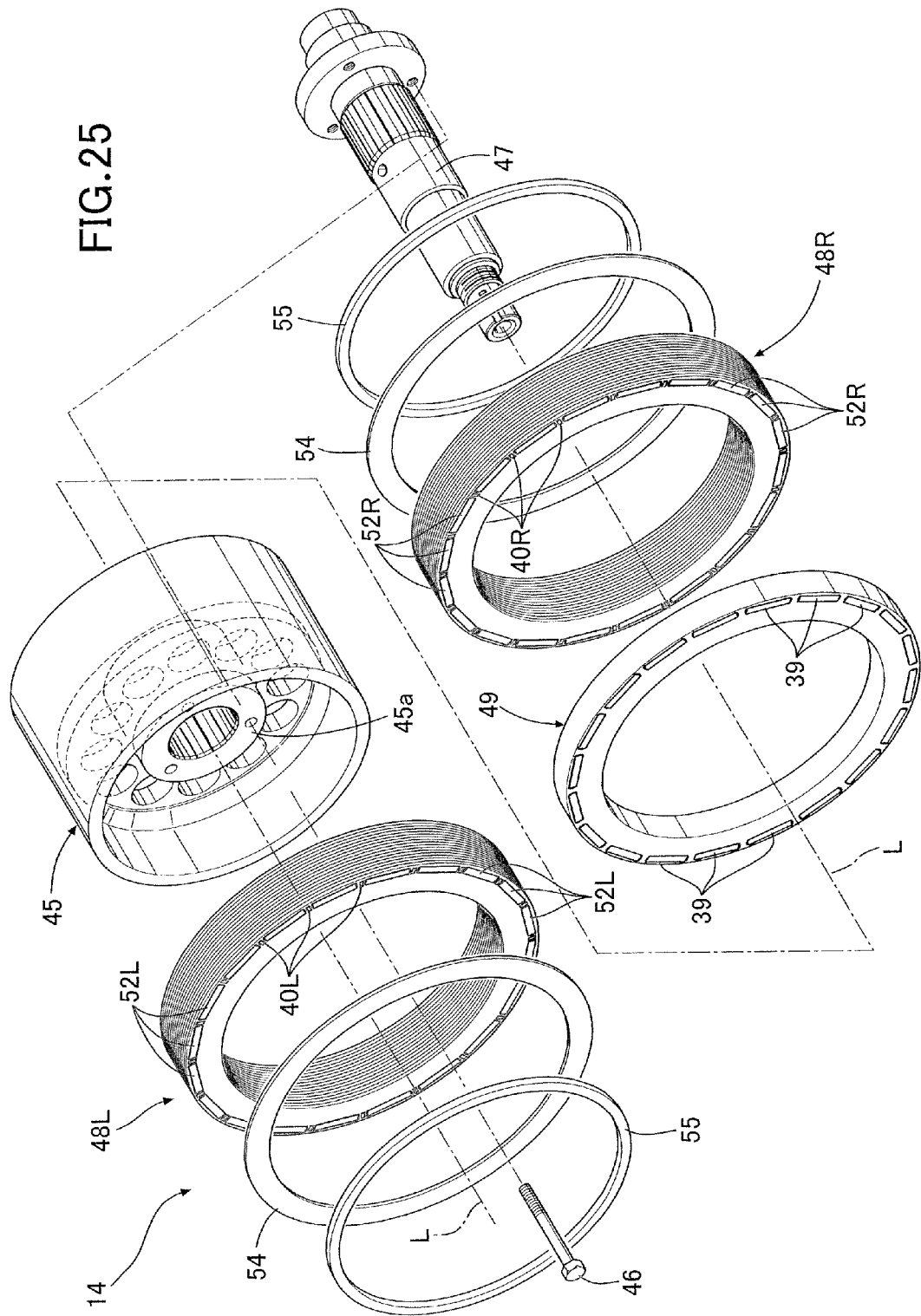
FIG. 25 is an exploded perspective view of an inner rotor (fourth embodiment).
Figure 26:
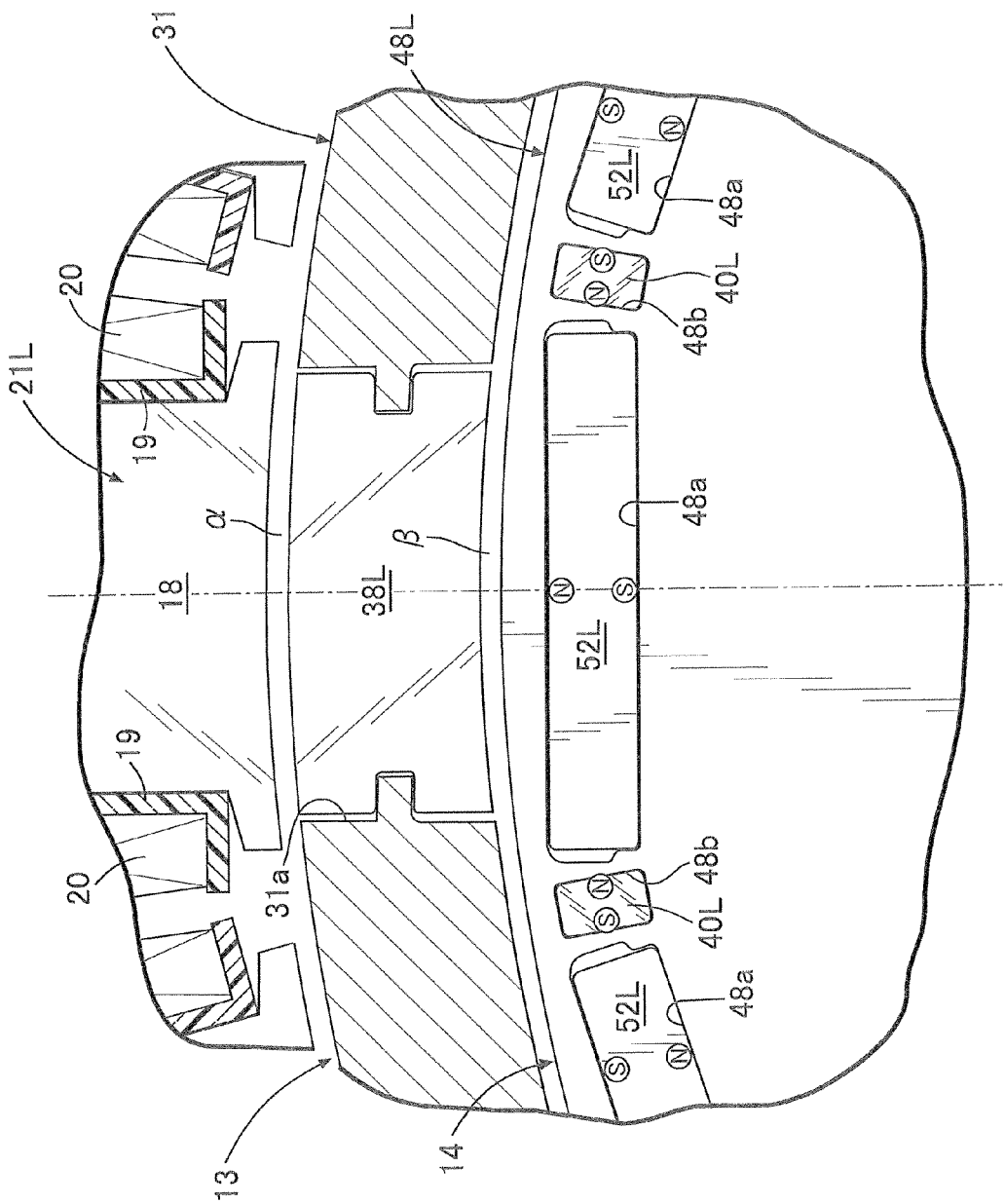
FIG. 26 is an enlarged view of part 26 in FIG. 19 (fourth embodiment).

Next, a second embodiment of the present invention is explained by reference to FIG. 16.

In the electric motor M of the first embodiment, of those adjacent to each other in the axis L direction, the polarity of the first armatures 21L of the first stator 12A and the polarity of the second armatures 21R of the second stator 12B are made to coincide with each other. In the second embodiment, first and second armatures 21L, 21R of first and second stators 12A, 12B that are adjacent to each other in the axis L direction are replaced by one armature 21.

In this way, integrating the first armatures 21L and the second armatures 21R of the first embodiment into the armatures 21 enables the first stator 12A and the second stator 12B to be combined into one stator 12. This enables an electric motor M to exhibit the same function as that of the first embodiment while cutting the number of components and further simplifying the structure.

Third Embodiment

Next, a third embodiment of the present invention is explained by reference to FIG. 17.

In the third embodiment, a first permanent magnet 52L and a second permanent magnet 52R forming one magnetic pole of an inner rotor 14 are each divided into two. In this case, in order for two permanent magnets to form one magnetic pole, it is necessary for the two permanent magnets to have identical polarities.

Fourth Embodiment

Next, a fourth embodiment of the present invention is explained by reference to FIG. 18 to FIG. 26.

First and second rotor cores 48L and 48R fitted around the outer periphery of a rotor body 45 have identical structures, and include a plurality (20 in this embodiment) of main permanent magnet support holes 48a along outer peripheral faces thereof (see FIG. 19 and FIG. 20), and first and second main permanent magnets 52L, 52R, which are substantially the same as the first and second permanent magnets 52L, 52R of the first to third embodiments, are inserted thereinto in an axis L direction. The first and second main permanent magnets 52L, 52R are disposed so that N poles and S poles face inside or outside in the radial direction, the polarities of adjacent first main permanent magnets 52L of the first rotor core 48L are alternatingly reversed, the polarities of adjacent second main permanent magnets 52R of the second rotor core 48R are alternatingly reversed, and the phase in the circumferential direction and the polarity of the first main permanent magnets 52L of the first rotor core 48L and the phase in the circumferential direction and the polarity of the second main permanent magnets 52R of the second rotor core 48R are displaced by 180° as electrical angles (see FIG. 19 and FIG. 20). That is, with regard to the polarity of magnetic poles on the outer peripheral face side of the first main permanent magnet 52L and the second main permanent magnet 52R, that are adjacent in the axis L direction, of the first rotor core 48L and the second rotor core 48R, if one thereof is an N pole, the other thereof is an S pole (see FIG. 23).

The same number of auxiliary permanent magnet support holes 49a (see FIG. 21) as there are first and second main permanent magnets 52L, 52R (20 in this embodiment) are formed along an outer peripheral face of a spacer 49 made of a weakly magnetic material, and auxiliary permanent magnets 39 are inserted thereinto in the axis L direction. Each auxiliary permanent magnet 39 is sandwiched between the first and second main permanent magnets 52L and 52R positioned on opposite sides thereof in the axis L direction, and the N pole and the S pole thereof are directed in the axis L direction. The N pole of the auxiliary permanent magnet 39 faces an N pole on the outer peripheral face of one of the first and second main permanent magnets 52L and 52R, and the S pole of the auxiliary permanent magnet 39 faces an S pole on the outer peripheral face of the other of the first and second main permanent magnets 52L and 52R. That is, magnetic flux from the N pole and the S pole on the outer peripheral faces of the first and second main permanent magnets 52L and 52R should naturally flow into first and second induced magnetic poles 38L, 38R of an outer rotor 13, and the magnetic pole of the auxiliary permanent magnet 39 is disposed in a direction in which short circuiting of the magnetic flux between the first and second main permanent magnets 52L and 52R is suppressed. Therefore, the magnetic pole directions of the auxiliary permanent magnets 39, 39 that are adjacent in the circumferential direction alternatingly reverse.

Furthermore, auxiliary permanent magnet support holes 48b are formed between circumferentially adjacent main permanent magnet support holes 48a of the first rotor core 48L, and first auxiliary permanent magnets 40L are inserted thereinto. The N pole and the S pole of the first auxiliary permanent magnets 40L are directed in the circumferential direction, the N pole of the first auxiliary permanent magnet 40L faces the N pole on the outer peripheral face of the circumferentially adjacent main permanent magnet 52L, and the S pole of the first auxiliary permanent magnet 40L faces the S pole on the outer peripheral face of the circumferentially adjacent main permanent magnet 52L (see FIG. 26). That is, short circuiting of surface magnetic flux between circumferentially adjacent main permanent magnets 52L is prevented by the first auxiliary permanent magnet 40L.

Second auxiliary permanent magnets 40R are provided in the second rotor core 48R in the same manner as for the first auxiliary permanent magnets 40L of the first rotor core 48L.

The demagnetization resistance of the auxiliary permanent magnets 39 and the first and second auxiliary permanent magnets 40L, 40R is set higher than the demagnetization resistance of the first and second main permanent magnets 52L, 52R. The reason therefor is that the magnetic force of the auxiliary permanent magnets 39 and the first and second auxiliary permanent magnets 40L, 40R might decrease when exposed to a reverse magnetic flux generated by the first and second main permanent magnets 52L, 52R, but if the demagnetization resistance of the auxiliary permanent magnets 39 and the first and second auxiliary permanent magnets 40L, 40R is set higher than the demagnetization resistance of the first and second main permanent magnets 52L, 52R, demagnetization of the auxiliary permanent magnets 39 and the first and second auxiliary permanent magnets 40L, 40R can be prevented.

The spacer 49, which is a weakly magnetic material, equipped with the auxiliary permanent magnets 39 is fitted around the outer periphery of the rotor body 45 in the middle in the axis L direction, the first and second rotor cores 48L and 48R are fitted on the outside thereof, a pair of support plates 54 and 54 for preventing the first and second main permanent magnets 52L, 52R and the first and second auxiliary permanent magnets 40L, 40R from falling out are fitted on the outside thereof, and a pair of stopper rings 55 and 55 are fixed on the outside thereof by press fitting.

Since short circuiting of surface magnetic flux between the first main permanent magnets 52L of the first rotor core 48L and the second main permanent magnets 52R of the second rotor core 48R of the inner rotor 14 is prevented by the auxiliary permanent magnets 39 provided in the spacer 49 sandwiched between the first and second rotor cores 48L and 48R, short circuiting of surface magnetic flux between the first main permanent magnets 52L of the first rotor core 48L is prevented by the first auxiliary permanent magnets 40L, and short circuiting of surface magnetic flux between the second main permanent magnets 52R of the second rotor core 48R is prevented by the second auxiliary permanent magnets 40R, it is possible to efficiently pass magnetic flux between the first and second main permanent magnets 52L, 52R of the inner rotor 14 and first and second armatures 21L, 21R, thus increasing the output of the electric motor M. In this arrangement, since the spacer 49 supporting the auxiliary permanent magnets 39 is formed from a weakly magnetic material, compared with a case in which it is formed from laminated steel sheets, not only is the cost low, but it is also possible to yet more reliably prevent short circuiting of surface magnetic flux between the first main permanent magnets 52L of the first rotor core 48L and the second main permanent magnets 52R of the second rotor core 48R of the inner rotor 14.

Fifth Embodiment

Figure 27:
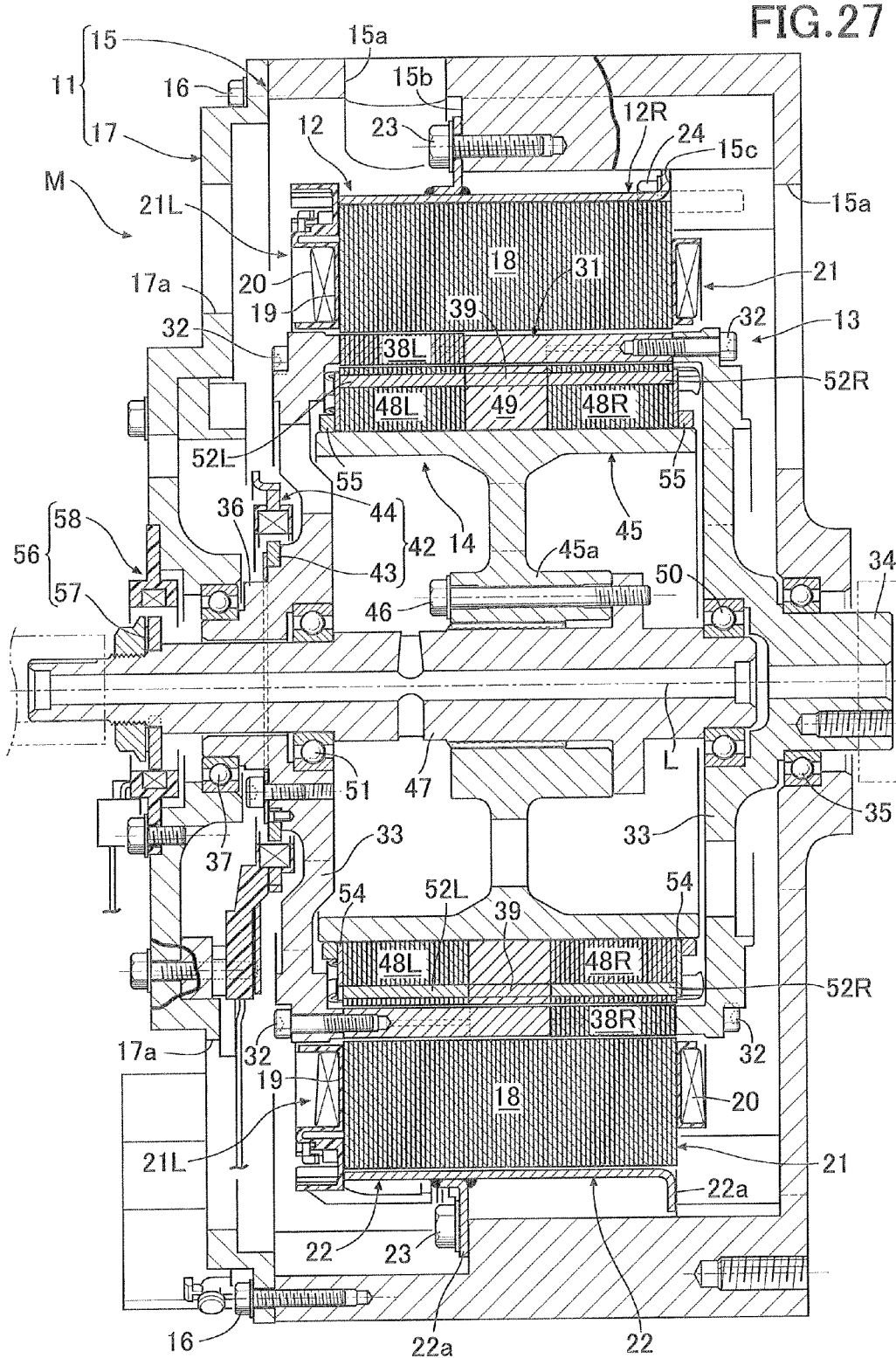
FIG. 27 is a view corresponding to FIG. 2 above (fifth embodiment).

Next, a fifth embodiment of the present invention is explained by reference to FIG. 27.

In the electric motor M of the fourth embodiment, the polarities of the first armatures 21L of the first stator 12A and the polarities of the second armatures 21R of the second stator 12B are made to coincide with each other for those adjacent to each other in the axis L direction. In the fifth embodiment, first and second armatures 21L, 21R of first and second stators 12A, 12B that are adjacent to each other in the axis L direction are replaced by one armature 21.

In this way, integrating the first armatures 21L and the second armatures 21R of the fourth embodiment into the armatures 21 enables the first stator 12A and the second stator 12B to be combined into one stator 12. This enables an electric motor M to exhibit the same function as that of the fourth embodiment while cutting the number of components and further simplifying the structure.

Sixth Embodiment

Figure 28:
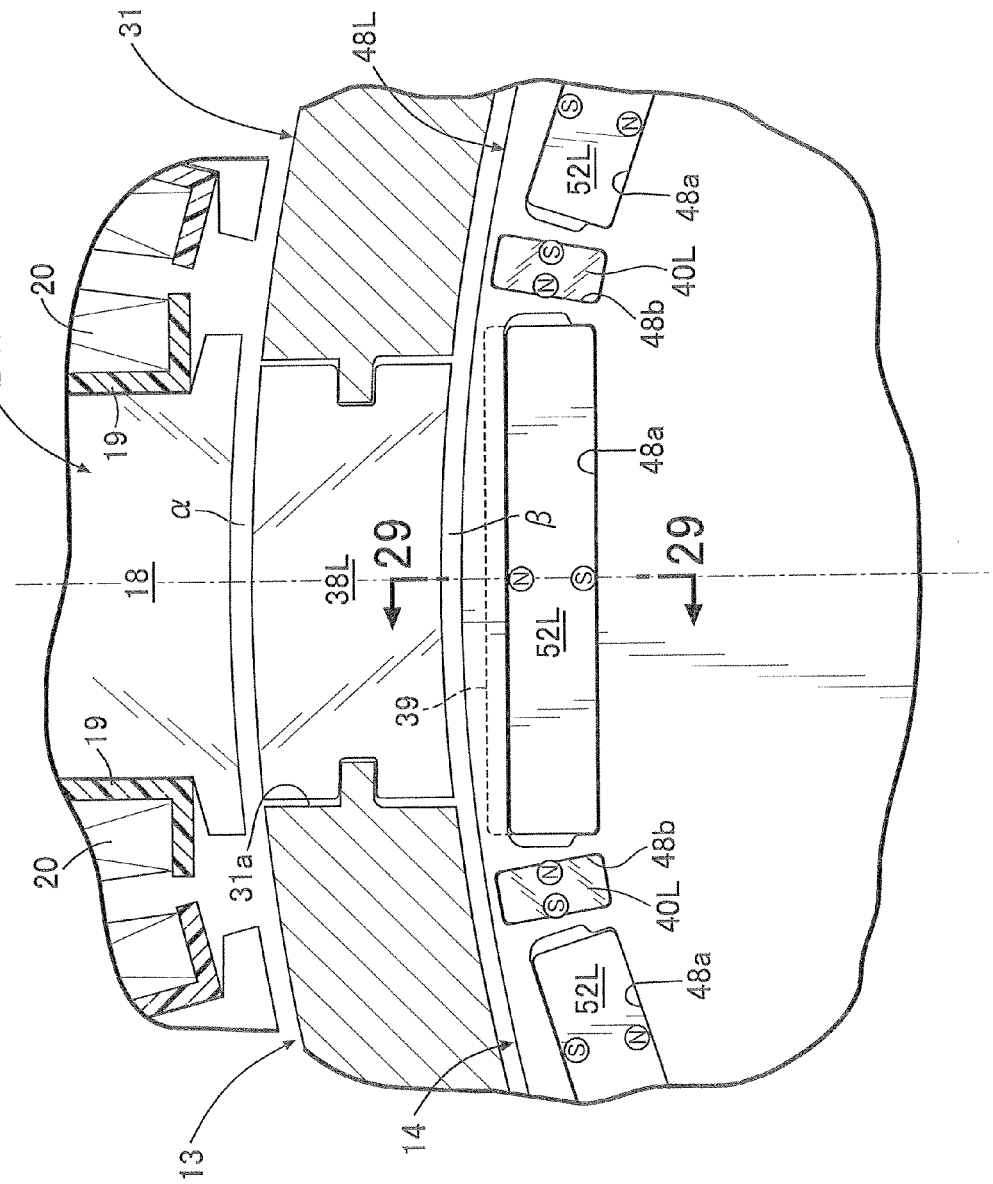
FIG. 28 is a view corresponding to FIG. 26 above (sixth embodiment).

Next, a sixth embodiment of the present invention is explained by reference to FIG. 28 and FIG. 29.

As is clear from a comparison of the fourth embodiment (see FIG. 26) and the sixth embodiment (see FIG. 28), the radially outer end of first auxiliary permanent magnets 40L of the sixth embodiment projects further outside in the radial direction than the radially outer end of first main permanent magnets 52L. This enables short circuiting of surface magnetic flux between circumferentially adjacent first main permanent magnets 52L to be prevented yet more effectively by means of the first auxiliary permanent magnets 40L. Here, the relationship between second auxiliary permanent magnets 40R and second main permanent magnets 52R is the same as that described above.

Figure 29:
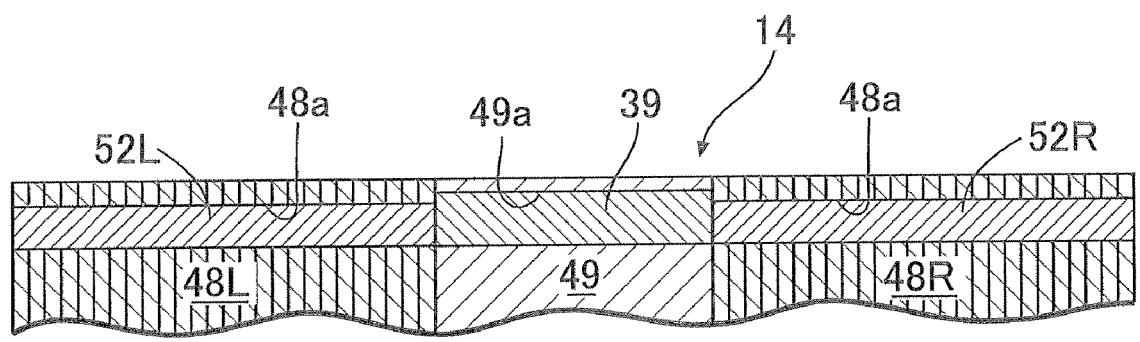
FIG. 29 is a cross-sectional view taken along line 29-29 in FIG. 28 (sixth embodiment).

Furthermore, as is clear from FIG. 29, the radially outer end of auxiliary permanent magnets 39 supported by a spacer 49 projects further outside in the radial direction than the radially outer end of first and second main permanent magnets 52L, 52R supported by first and second rotor cores 48L and 48R. This enables short circuiting of surface magnetic flux between first and second main permanent magnets 52L, 52R that are adjacent in the axis L direction to be prevented yet more effectively by means of the auxiliary permanent magnets 39.

Seventh Embodiment

Next, a seventh embodiment of the present invention is explained by reference to FIG. 30.

In the seventh embodiment, a first main permanent magnet 52L and a second main permanent magnet 52R forming one magnetic pole of an inner rotor 14 are each divided into two. In this case, in order for two main permanent magnets to form one magnetic pole, it is necessary for the two main permanent magnets to have identical polarities.

Eighth Embodiment

Next, an eighth embodiment of the present invention is explained by reference to FIG. 31.

The eighth embodiment is characterized by the shape of auxiliary permanent magnet support holes 49a of an annular spacer 49 sandwiched between first and second rotor cores 48L and 48R of an inner rotor 14 and the shape of auxiliary permanent magnets 39 fitted thereinto.

That is, each auxiliary permanent magnet 39 has a hexagonally-shaped cross section that is uniform in an axis L direction and is surrounded by an inner peripheral face a extending in substantially the circumferential direction (strictly speaking not an arc but a straight line) relative to the axis L, an outer peripheral face b extending in the circumferential direction relative to the axis L, a pair of side faces c and c extending radially relative to the axis L, and a pair of inclined faces d and d connecting radially outer end parts of the pair of side faces c and c and circumferentially opposite end parts of the outer peripheral face b.

When this auxiliary permanent magnet 39 is fitted into the auxiliary permanent magnet support hole 49a, the inner peripheral face a and the pair of inclined faces d and d abut against the auxiliary permanent magnet support hole 49a, but a slight gap γ extending in the circumferential direction is formed between the outer peripheral face b and the auxiliary permanent magnet support hole 49a, and a semicircular gap δ is formed between the pair of side faces c and c and the auxiliary permanent magnet support hole 49a. In particular, the spacer 49 includes a pair of radial load-supporting portions 49b and 49b facing the pair of inclined faces d and d of the auxiliary permanent magnet 39 and a band-shaped bridge portion 49c providing a connection in the circumferential direction between the pair of radial load-supporting portions 49b and 49b, and the gap γ is formed between the bridge portion 49c and the outer peripheral face b of the auxiliary permanent magnet 39.

Now, when the inner rotor 14 rotates and a radially outward centrifugal force acts on the auxiliary permanent magnet 39, the centrifugal force is transmitted from the pair of inclined faces d and d of the auxiliary permanent magnet 39 to the pair of radial load-supporting portions 49b and 49b of the spacer 49, and the auxiliary permanent magnet 39 can be positioned in the circumferential direction by means of the pair of inclined faces d and d. Moreover, since the pair of radial load-supporting portions 49b and 49b are joined to each other via the bridge portion 49c, the rigidity increases, thus reliably supporting the auxiliary permanent magnet 39. Furthermore, since the gap γ is formed between the bridge portion 49c of the spacer 49 and the outer peripheral face b of the auxiliary permanent magnet 39, a shear load in the radial direction does not act on the bridge portion 49c, but only a tensile load in the circumferential direction acts thereon, and even if the bridge portion 49c is thin, it is possible to prevent effectively stress from concentrating in the radial load-supporting portions 49b and 49b.

Here, since the auxiliary permanent magnet 39 is for preventing, by means of magnetic flux in the axis L direction, short circuiting of surface magnetic flux between the first main permanent magnets 52L of the first rotor core 48L and the second main permanent magnets 52R of the second rotor core 48R of the inner rotor 14, even if the gap γ is present radially outside the outer peripheral face b of the auxiliary permanent magnet 39, the above-mentioned effect of preventing short circuiting of surface magnetic flux is not affected.

Modes for carrying out the present invention are explained above, but the present invention may be modified in a variety of ways as long as the modifications do not depart from the spirit and scope thereof.

For example, in the embodiments, the armatures 21L and 21R (or 21) are provided on the stators 12L and 12R (or 12) disposed on the radially outer side, and the (main) permanent magnets 52L and 52R are provided on the inner rotor 14 disposed on the radially inner side, but the positional relationship between the armatures 21L and 21R (or 21) and the (main) permanent magnets 52L and 52R may be reversed.

Furthermore, the number of pairs of poles of the electric motor M of the embodiments is 10, but the number of pairs of poles thereof may be selected as appropriate.

Moreover, the coil 20 of the stators 12L and 12R (or 12) of the embodiments is a concentrated winding, but it may be a distributed winding.

Furthermore, in the embodiments, the electric motor M is illustrated, but the present invention may be applied to a rotor of any rotating electric machine such as a generator.

Moreover, with regard to the first and second (main) permanent magnets 52L and 52R of the embodiments, the N pole and the S pole are disposed inside and outside in the radial direction, but they may be disposed in the circumferential direction.

The invention claimed is:

1. An electric motor comprising an annular stator (12L, 12R) disposed so as to surround an axis (L), a first rotor (14) that is rotatable around the axis (L), and a second rotor (13) that is rotatable around the axis (L) and is disposed between the stator (12L, 12R) and the first rotor (14), wherein the stator (12L, 12R) is formed by arranging side by side in a direction of the axis (L) a first row of armatures and a second row of armatures, the first row of armatures comprising a plurality of first armatures (21L) disposed in the circumferential direction and generating a first rotating magnetic field that rotates along the circumferential direction by means of magnetic poles generated by the plurality of first armatures (21L) in response to the supply of electric power, and the second row of armatures comprising a plurality of second armatures (21R) disposed in the circumferential direction and generating a second rotating magnetic field that rotates along the circumferential direction by means of magnetic poles generated by the plurality of second armatures (21R) in response to the supply of electric power, the first rotor (14) is formed by arranging side by side in the axis (L) direction a first row of permanent magnets and a second row of permanent magnets, the first row of permanent magnets comprising a plurality of first permanent magnets (52L) disposed so as to have magnetic poles with different polarities alternating at a predetermined pitch (P) in the circumferential direction, and the second row of permanent magnets comprising a plurality of second permanent magnets (52R) disposed so as to have magnetic poles with different polarities alternating at the predetermined pitch (P) in the circumferential direction, the second rotor (13) is formed by arranging side by side in the axis (L) direction a first row of induced magnetic poles and a second row of induced magnetic poles, the first row of induced magnetic poles comprising a plurality of first induced magnetic poles (38L), made of a soft magnetic material, disposed at the predetermined pitch (P) in the circumferential direction, and the second row of induced magnetic poles comprising a plurality of second induced magnetic poles (38R), made of a soft magnetic material, disposed at the predetermined pitch (P) in the circumferential direction, the first row of armatures and the first row of permanent magnets face respective radially opposite sides of the first row of induced magnetic poles, the second row of armatures and the second row of permanent magnets face respective radially opposite sides of the second row of induced magnetic poles, the phase of the polarity of the first rotating magnetic field and the phase of the polarity of the second rotating magnetic field of the stator (12L, 12R) coincide with each other, the phase of the first induced magnetic pole (38L) and the phase of the second induced magnetic pole (38R) of the second rotor (13) are displaced from each other by only half of the predetermined pitch (P) in the circumferential direction, and the phase of the magnetic pole of the first row of permanent magnets and the phase of the magnetic pole of the second row of permanent magnets of the first rotor (14) are displaced by only the predetermined pitch (P) in the circumferential direction.

2. An electric motor comprising an annular stator (12) disposed so as to surround an axis (L), a first rotor (14) that is rotatable around the axis (L), and a second rotor (13) that is rotatable around the axis (L) and is disposed between the stator (12) and the first rotor (14), wherein the stator (12) is formed from a row of armatures comprising a plurality of armatures (21) disposed in the circumferential direction and generating a rotating magnetic field that rotates along the circumferential direction by means of magnetic poles generated by the plurality of armatures (21) in response to the supply of electric power, the first rotor (14) is formed by arranging side by side in a direction of the axis (L) a first row of permanent magnets and a second row of permanent magnets, the first row of permanent magnets comprising a plurality of first permanent magnets (52L) disposed so as to have magnetic poles with different polarities alternating at a predetermined pitch (P) in the circumferential direction, and the second row of permanent magnets comprising a plurality of second permanent magnets (52R) disposed so as to have magnetic poles with different polarities alternating at the predetermined pitch (P) in the circumferential direction, the second rotor (13) is formed by arranging side by side in the axis (L) direction a first row of induced magnetic poles and a second row of induced magnetic poles, the first row of induced magnetic poles comprising a plurality of first induced magnetic poles (38L), made of a soft magnetic material, disposed at the predetermined pitch (P) in the circumferential direction, and the second row of induced magnetic poles comprising a plurality of second induced magnetic poles (38R), made of a soft magnetic material, disposed at the predetermined pitch (P) in the circumferential direction, the row of armatures and the first row of permanent magnets face respective radially opposite sides of the first row of induced magnetic poles, the row of armatures and the second row of permanent magnets face respective radially opposite sides of the second row of induced magnetic poles, the phase of the first induced magnetic pole (38L) and the phase of the second induced magnetic pole (38R) of the second rotor (13) are displaced by only half of the predetermined pitch (P) in the circumferential direction, and the phase of the magnetic pole of the first row of permanent magnets and the phase of the magnetic pole of the second row of permanent magnets of the first rotor (14) are displaced by only the predetermined pitch (P) in the circumferential direction.

3. The electric motor according to claim 1 or claim 2, wherein a plurality of slits (31a, 31b) extending linearly in the axis (L) direction are formed in a cylindrical rotor body (31) of the second rotor (13), and the first and second induced magnetic poles (38L, 38R) are fitted into the slits (31a, 31b).

4. A rotor for a rotating electric machine in which a plurality of rows of magnetic poles, having a plurality of main permanent magnets (52L, 52R) disposed so that magnetic poles with different polarities are alternatingly arranged in the circumferential direction, are arranged side by side in a direction of an axis (L), and the mutually opposing main permanent magnets (52L, 52R) of the rows of magnetic poles that are adjacent in the axis (L) direction are made to have different polarities, wherein an auxiliary permanent magnet (39) is provided between the main permanent magnets (52L, 52R), of the two adjacent rows of magnetic poles, that are mutually opposing in the axis (L) direction, and the polarity of the auxiliary permanent magnet (39) is disposed so as to suppress short circuiting of surface magnetic flux between the mutually opposing main permanent magnets (52L, 52R).

5. The rotor for a rotating electric machine according to claim 4, wherein a demagnetization resistance of the auxiliary permanent magnet (39) is set larger than a demagnetization resistance of the main permanent magnet (52L, 52R).

6. The rotor for a rotating electric machine according to claim 4 or claim 5, wherein the auxiliary permanent magnet (39) is made to project further toward the stator side than the main permanent magnet (52L, 52R).

7. The rotor for a rotating electric machine according to claim 4 or claim 5, wherein the auxiliary permanent magnet (39) is supported on an outer peripheral part of a spacer (49), made of a weakly magnetic material, disposed between the plurality of rows of magnetic poles.

8. The rotor for a rotating electric machine according to claim 7, wherein the auxiliary permanent magnet (39) comprises: an inner peripheral face (a) and an outer peripheral face (b) that extend in the circumferential direction relative to the axis (L); a pair of side faces (c) that extend in the radial direction relative to the axis (L); and a pair of inclined faces (d) that connect radially outer end parts of the pair of side faces (c) and circumferentially opposite end parts of the outer peripheral face (b), an auxiliary permanent magnet support hole (49*a*) is formed in an outer peripheral part of the spacer (49), the auxiliary permanent magnet (39) being fitted into the auxiliary permanent magnet support hole (49*a*), and at least the pair of inclined faces (d) of the auxiliary permanent magnet (39) are in contact with a pair of radial load-supporting portions (49*b*) in the area around the auxiliary permanent magnet support hole (49*a*).

9. The rotor for a rotating electric machine according to claim 8, wherein the spacer (49) comprises a bridge portion (49*c*) connecting the pair of radial load-supporting portions (49*b*), and the bridge portion (49*c*) faces the outer peripheral face (b) of the auxiliary permanent magnet (39) across a gap (γ).

10. A rotor for a rotating electric machine in which a plurality of rows of magnetic poles, having a plurality of main permanent magnets (52L, 52R) disposed so that magnetic poles with different polarities are alternatingly arranged in the circumferential direction, are arranged side by side in an axis (L) direction, and the mutually opposing main permanent magnets (52L, 52R) of the rows of magnetic poles that are adjacent in the axis (L) direction are made to have different polarities, wherein an auxiliary permanent magnet (40L, 40R) is provided between the main permanent magnets (52L, 52R) that are mutually opposing in the circumferential direction, and the polarity of the auxiliary permanent magnet (40L, 40R) is disposed so as to suppress short circuiting of surface magnetic flux between the mutually opposing main permanent magnets (52L, 52R).

11. The rotor for a rotating electric machine according to claim 10, wherein a demagnetization resistance of the auxiliary permanent magnet (40L, 40R) is set larger than a demagnetization resistance of the main permanent magnet (52L, 52R).

12. The rotor for a rotating electric machine according to claim 10 or claim 11, wherein the auxiliary permanent magnet (40L, 40R) is made to project further toward the stator side than the main permanent magnet (52L, 52R).

13. An electric motor comprising the rotor for a rotating electric machine according to any one of claims 4, 5, 10 and 11 as a first rotor (14), wherein the electric motor comprises a second rotor (13) between the first rotor (14) and a stator (12L, 12R, 12), the stator (12L, 12R, 12) comprises a plurality of armatures (21L, 21R, 21) disposed in the circumferential direction, and generates a rotating magnetic field that rotates along the circumferential direction by means of magnetic poles generated in the plurality of armatures (21L, 21R, 21) in response to the supply of electric power, the first rotor (14) is formed by arranging side by side in the axis (L) direction a first row of permanent magnets and a second row of permanent magnets, the first row of permanent magnets comprising a plurality of first permanent magnets (52L) disposed so as to have magnetic poles with different polarities alternating at a predetermined pitch (P) in the circumferential direction, and the second row of permanent magnets comprising a plurality of second permanent magnets (52R) disposed so as to have magnetic poles with different polarities alternating at the predetermined pitch (P) in the circumferential direction, the second rotor (13) is formed by arranging side by side in the axis (L) direction a first row of induced magnetic poles and a second row of induced magnetic poles, the first row of induced magnetic poles comprising a plurality of first induced magnetic poles (38L), made of a soft magnetic material, disposed at the predetermined pitch (P) in the circumferential direction, and the second row of induced magnetic poles comprising a plurality of second induced magnetic poles (38R), made of a soft magnetic material, disposed at the predetermined pitch (P) in the circumferential direction, the row of armatures of the stator (12L, 12R, 12) and the first row of permanent magnets face respective radially opposite sides of the first row of induced magnetic poles, and the row of armatures of the stator (12L, 12R, 12) and the second row of permanent magnets face respective radially opposite sides of the second row of induced magnetic poles, the phase of the first induced magnetic pole (38L) and the phase of the second induced magnetic pole (38R) of the second rotor (13) is displaced from each other by only half of the predetermined pitch (P) in the circumferential direction, and the phase of the magnetic pole of the first row of permanent magnets and the phase of the magnetic pole of the second row of permanent magnets of the first rotor (14) is displaced by only the predetermined pitch (P) in the circumferential direction.

* * * * *